(12) United States Patent
Miller et al.

(10) Patent No.: US 8,775,710 B1
(45) Date of Patent: Jul. 8, 2014

(54) MOBILE INFORMATION HANDLING APPARATUS

(75) Inventors: Matthew Miller, Cedar Rapids, IA (US); Steven R. Kunert, Cedar Rapids, IA (US)

(73) Assignee: Mobiledemand LC, Hiawatha, IA (US)

( * ) Notice: Subject to any disclaimer, the term of this patent is extended or adjusted under 35 U.S.C. 154(b) by 232 days.

(21) Appl. No.: 13/368,153

(22) Filed: Feb. 7, 2012

Related U.S. Application Data

(60) Provisional application No. 61/440,111, filed on Feb. 7, 2011.

(51) Int. Cl.
*G06F 13/00* (2006.01)
*G06F 1/16* (2006.01)

(52) U.S. Cl.
USPC ............. 710/303; 361/679.17; 361/679.19; 361/679.41

(58) Field of Classification Search
CPC ....... G06F 1/16; G06F 1/1313; G06F 1/1615; G06F 1/1616; G06F 1/1624; G06F 1/1626; G06F 1/1632; G06F 1/1656; G06F 1/1658; G06F 1/1669; G06F 1/1679; G06F 1/1683; G06F 1/181; G06F 13/4068; G06F 2200/1633
USPC ........... 710/303; 361/679.01, 679.02, 679.17, 361/679.19, 679.55, 679.56, 679.58, 361/728–733, 740, 679.41
See application file for complete search history.

(56) References Cited

U.S. PATENT DOCUMENTS

| | | | | |
|---|---|---|---|---|
| 5,825,617 A | * | 10/1998 | Kochis et al. | 361/679.43 |
| 6,532,152 B1 | * | 3/2003 | White et al. | 361/692 |
| 2003/0198007 A1 | * | 10/2003 | Wulff et al. | 361/680 |
| 2005/0050248 A1 | * | 3/2005 | York | 710/72 |
| 2008/0259551 A1 | * | 10/2008 | Gavenda et al. | 361/684 |
| 2010/0008028 A1 | * | 1/2010 | Richardson et al. | 361/679.01 |

* cited by examiner

*Primary Examiner* — Glenn A Auve

(74) *Attorney, Agent, or Firm* — Suiter Swantz pc llo

(57) ABSTRACT

A mobile information handling apparatus and system is configured for convenient mobile data entry, communication, and computation. A mobile computing device is configured to detachably mount on an adjustable dock and couple and communicate with a keyboard I/O device and a communication portion when mounted on the dock. The dock is configured to support the computing device, keyboard, and communication portion as well as secure the apparatus to a base via a ball mount. Corner protectors are configured to protect the mobile computing device as well as couple to shoulder straps and a palm cover configured to secure to the hand of an operator. Detachable fans configured to mount to the computing device are powered and controlled by the computing device.

29 Claims, 26 Drawing Sheets

MOBILE INFORMATION HANDLING APPARATUS

CROSS-REFERENCE TO RELATED APPLICATIONS

The present application claims the benefit under 35 U.S.C. §119(e) of U.S. Provisional Application Ser. No. 61/440,111, filed 7 Feb. 2011, which is incorporated herein by reference.

TECHNICAL FIELD

The present disclosure relates generally to the field of portable electronic devices and more particularly to a tablet computing system configured for portable carriage and peripheral versatility.

BACKGROUND

Portable tablet computing devices may increase productivity while maintaining a small lightweight form factor. Goals of manufacturers of these tablet devices may include light weight, fast processors, and long battery life. On occasion, these goals may conflict. For example, a light weight battery powered device may be configured with a small, lower powered battery of limited usable life. A powerful processor may require a larger form factor and increased weight. A variety of communication ports may require a large form factor and a heavier complete system. As such, it is desirable to provide an apparatus and system which may balance these portable computer goals, combining a small form factor device with a variety of communication ports configured as a lightweight, versatile system.

SUMMARY

The present disclosure is directed to an apparatus and system for mobile information handling. The apparatus may comprise a mobile computing device including a first communications port and a keyboard module for providing alphanumeric data entry to the mobile computing device. The keyboard module may include a second communications port and a third communications port. The apparatus may further comprise an adjustable dock for mounting the mobile computing device and the keyboard module, the adjustable dock including a fourth communications port. The adjustable dock may be configurable in a first position for mounting the mobile computing device within the dock to create a first physical data connection via the first communications port and the fourth communications port. The adjustable dock may also be configurable in a second position for mounting both the mobile computing device and the keyboard module to create a second physical data connection via the first communications port and the second communications port and a third physical data connection via the third communications port and the fourth communications port.

An additional embodiment of the present invention is directed to a mobile information handling system. The system may comprise a mobile computing device including a first communications port, a secure Personal information number Entry Device (PED) module including two tabs, the two tabs configured to interlock with grooves in a cover of the mobile computing device.

A further embodiment of the present invention is directed to a mobile information handling system. The system may comprise a mobile computing device including a communications port and a secure Personal information number Entry Device (PED) module. The PED module may include a module cover piece for encapsulating the electronic circuitry of the secure PED module. The module cover piece may be configured for attachment to a front cover of the mobile computing device via a plurality of screws.

A further embodiment of the present invention is directed to a mobile information handling system. The system may comprise a mobile computing device including a first communications port. The mobile information handling system may further comprise a keyboard module for providing alphanumeric data entry to the mobile computing device, the keyboard module including a second communications port and a third communications port. The mobile information handling system may further comprise an adjustable dock for mounting the mobile computing device and the keyboard module. The adjustable dock may include a fourth communications port. The adjustable dock may be configurable in a first position for mounting the mobile computing device within the dock to create a first physical data connection via the first communications port and the fourth communications port. The adjustable dock may be further configurable in a second position for mounting the mobile computing device and the keyboard module to create a second physical data connection via the first communications port and the second communications port and a third physical data connection via the third communications port and the fourth communications port. The mobile information handling system may further comprise corner protectors including a first corner protector and a second corner protector, each of which may include a strap anchor and a strap attachment point. The mobile information handling system may further comprise a strap means including a first hook fastener and a second hook fastener, wherein the strap means is configured to be worn over a shoulder of a user for carrying the mobile while the strap means is attached to the first corner protector and the second corner protector; and a fan module connected to the mobile computing device for cooling the mobile computing device, the fan module incorporated in a back cover panel of the mobile computing device, wherein the fan module is controlled via a firmware interface of the mobile computing device.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present disclosure may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to an apparatus and system for mobile information handling. The apparatus and system may be configured for convenient carriage and attachment of a variety of peripheral devices while maintaining a relatively small form factor and light weight.

Referring generally to FIGS. 1-5, illustrations 100-500 of a carrying system for a mobile information handling apparatus are shown. Mobile information handling apparatus 110 may be comprised of a mobile computing device, such as a tablet computer, laptop, PDA or a like mobile computing device. In an exemplary embodiment, mobile computing device may be a tablet PC such as the xTablet T7000 computer, available from Mobile Demand, LLC, 1350 Boyson Road, Bldg. B, Hiawatha, Iowa 52233. Mobile information handling apparatus 110 may further comprise a carrying system for coupling to the mobile information handling apparatus 110. The carrying system may facilitate transport of the mobile computing device, by providing one handed or one armed transportation of the device. The carrying system may be particularly suited to persons who compute without the aid of a desk or a table—for example, while commuting or traveling. The carrying system may be particularly suited to those who compute on their feet—for example, persons who inventory goods (e.g., moving personnel who inventory goods located on a premises in preparation for packing and shipping goods), persons conducting retail invoicing and pricing, census takers, building inspectors, and/or insurance adjusters.

Figure 1:
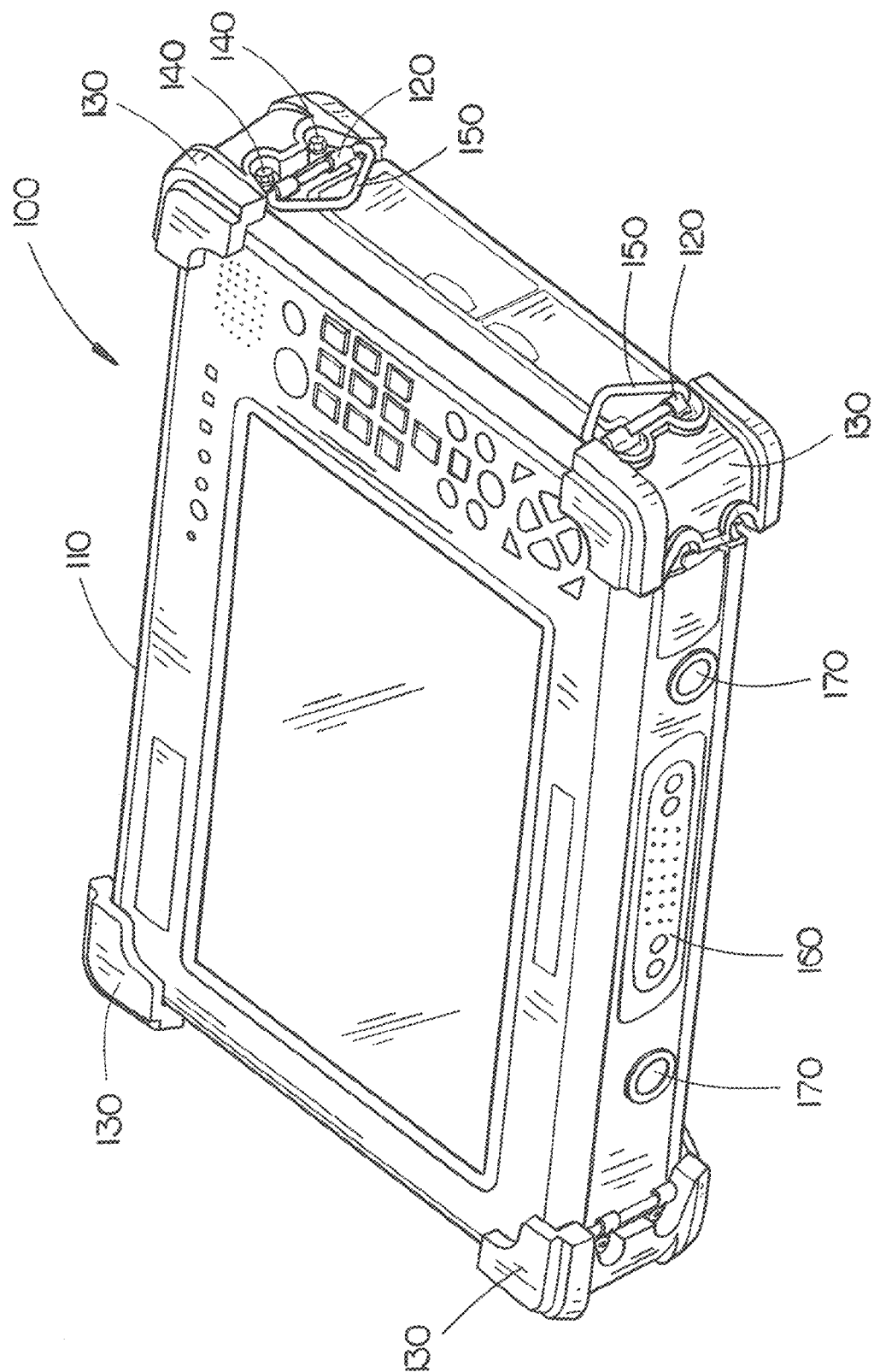
FIG. 1 is a front isometric view of the a mobile computing device with corner extenders.

Referring specifically to FIG. 1, embodiments of the carrying system may include a plurality of attachment elements. Attachment elements 120 may be located substantially within corner extenders 130 (ex—corner protectors) coupled to at least two corners of a mobile computing device 110. For instance, a corner extender 130 may comprise a bracket/housing molded to form extended rounded edge corners for coupling to the corners of the mobile computing device 110. Attachment elements 120 may be embedded within the body of the housing. Further, attachment elements 120 may include a hole suitable for insertion of a fastening mechanism 140. In embodiments, attachment elements 120 may be fixed in position by the same fastening mechanism 140 utilized to fasten the housing. For instance, a screw, bolt, nail or other such fastening device may fasten both the attachment element and the housing. In another embodiment, separate fastening devices may fasten the attachment element and the housing. Alternatively, a housing/bracket may house an attachment element. Attachment elements 120 may be disposed at opposite ends of the mobile computing device and may be formed of a rigid material. The attachment element 120 may be made of metal or a durable plastic, and may include a thin semi-circular metallic, plastic, and/or like durable material rod. The attachment element 120 may include a thin flat plate. Further, attachment element 120 may include one or more curved areas at one end to securely hold a strap attachment point 150 such as a D-ring.

Figure 2:
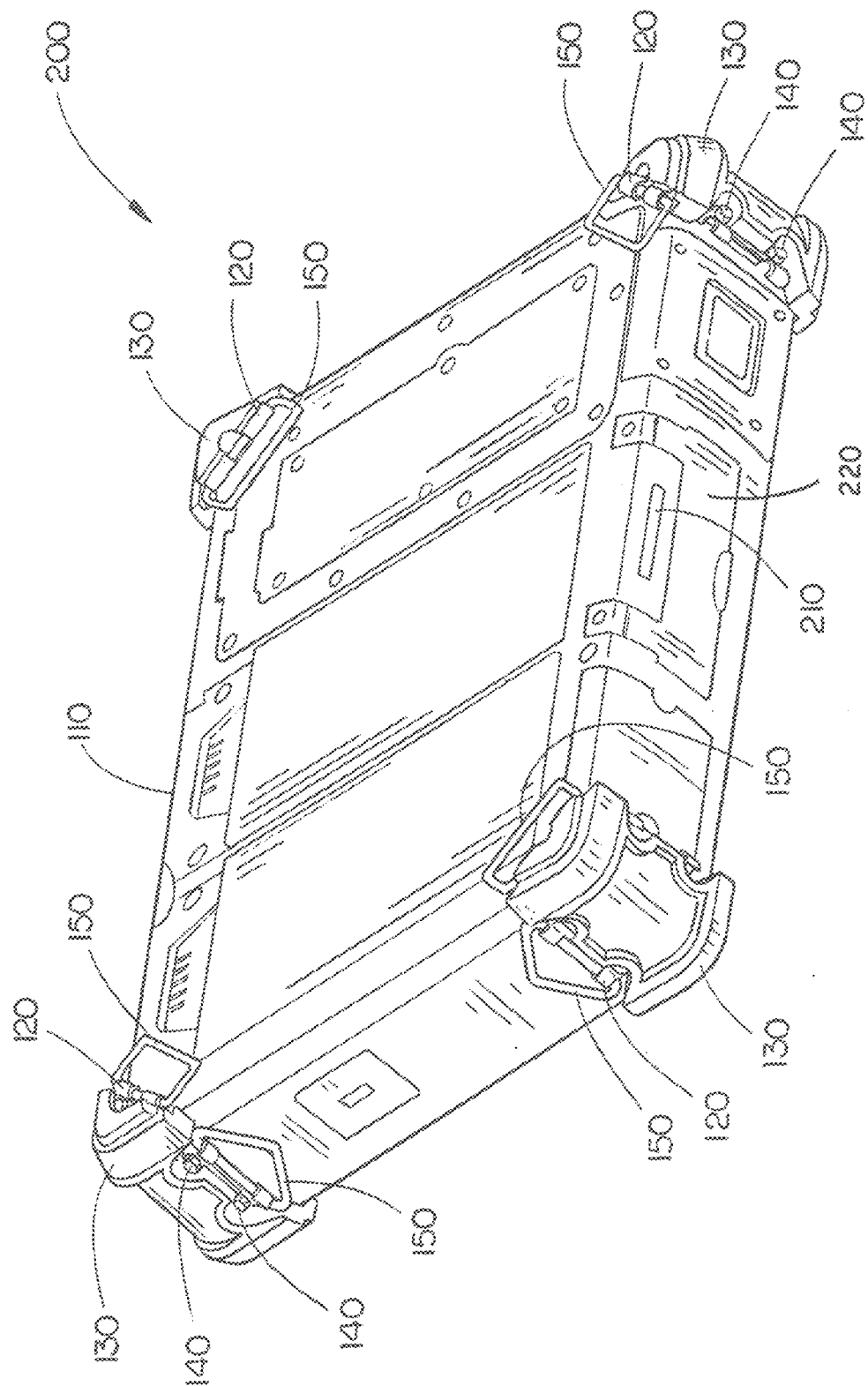
FIG. 2 is a rear isometric view of a mobile computing device with corner extenders.
Figure 3:
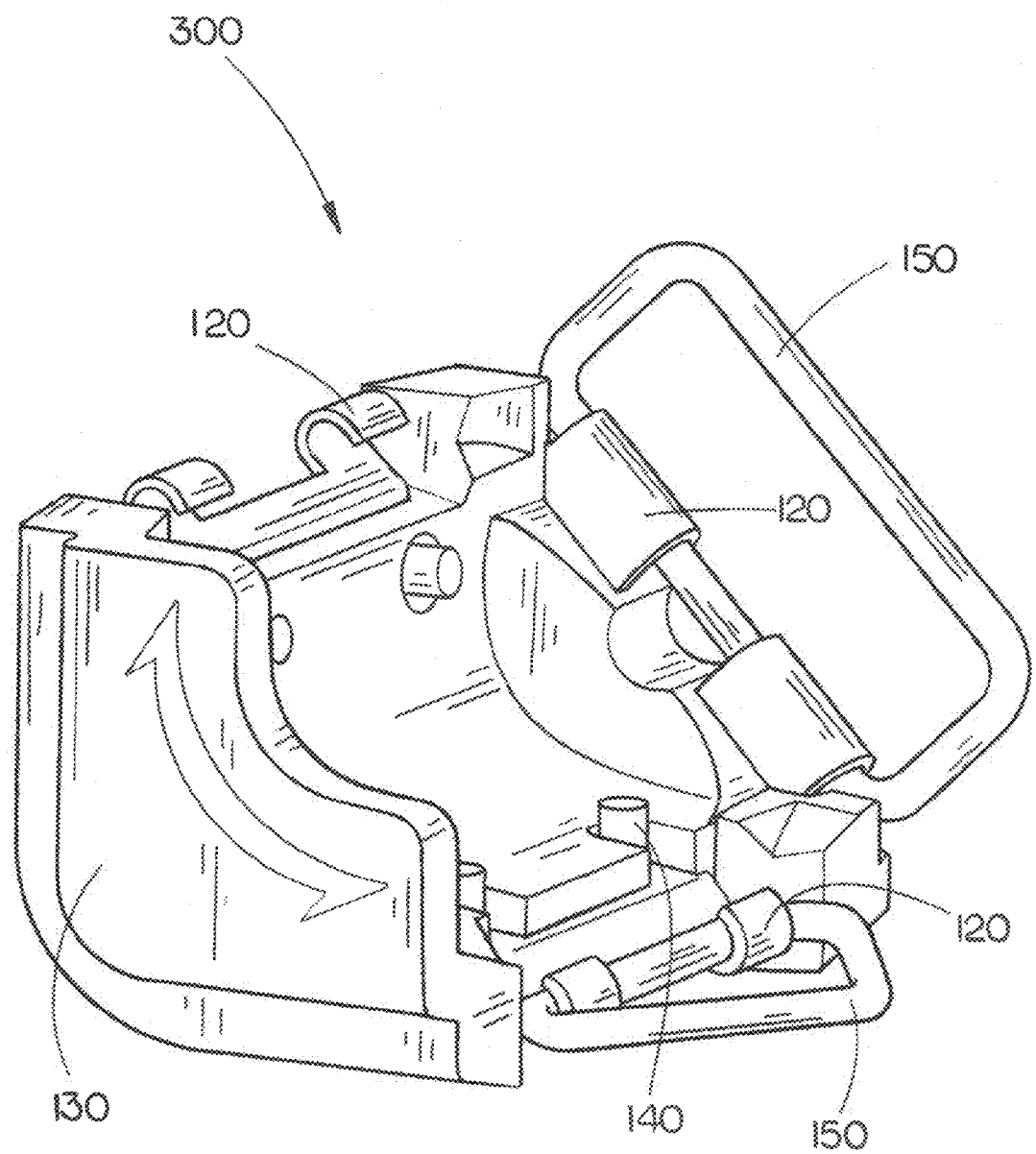
FIG. 3 is a isometric view of a corner extender.

Referring specifically to FIG. 2, embodiments of the mobile information handling apparatus may include one or more slots 210. The one or more slots 210 may be configured and located to receive a securing portion discussed below.

Carrying system may further include a hand strap, shoulder strap or like strap. For example, a strap 410 may be made of a rigid, flexible or malleable material such as leather, fabric, plastic, and/or any other suitable material of sufficient strength to carry a device. One or more ends of a strap 410 may be attached to a portion of a hook fastener 420. Hook fastener 420 may include a fastener designed to remain closed around a ring. For example, hook fastener may include a spring hook, snap hook, and/or sleeve hook.

Attachment elements 120 may be oriented so straps 410 are attachable to the strap attachment points 150 of two corner extenders 130. In some embodiments, the straps 410 and the attachment elements 120 are configured for orienting substantially parallel to a short side of the front cover of the mobile computing device 110. In other embodiments, the straps 410 and the attachment elements 120 may be oriented so straps 410 are attached to the strap attachment points 150 of two corner extenders 130 substantially parallel to a long side of the front cover of the mobile computing device 110. Further, attachment elements 120 may be oriented so straps 410 attached to the strap attachment points 150 of two corner extenders 130 are substantially parallel to a diagonal of the back cover of the mobile computing device 110. Corner extenders 130 may include one or more attachment elements 120, each attachment element 120 holding a separate strap attachment point 150 in a separate orientation. In addition, corner extenders 130 may be configured so individual attachment elements 120 do not have a strap attachment point 150.

Figure 4:
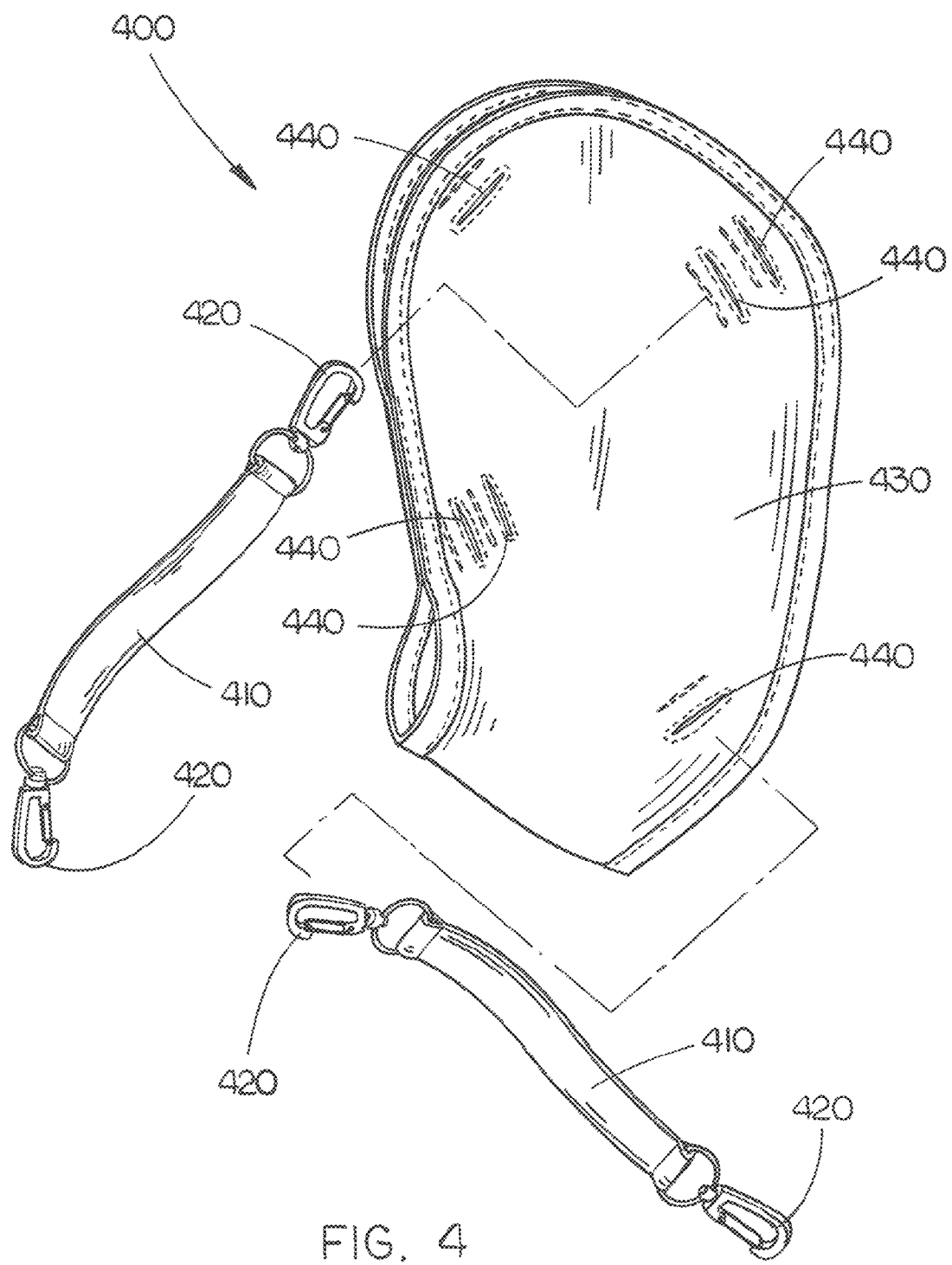
FIG. 4 is an exploded view of a palm cover and straps.
Figure 5:
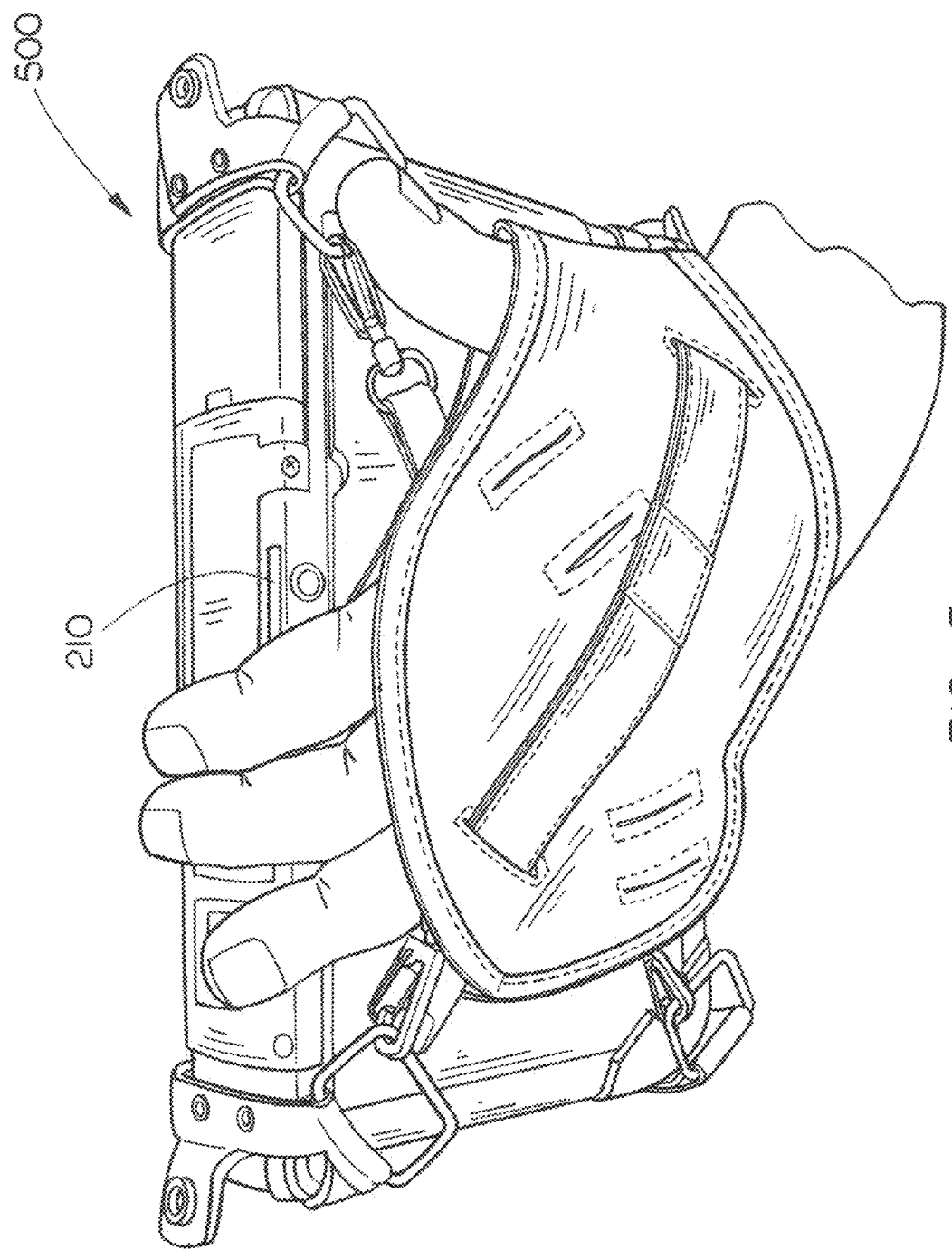
FIG. 5 is an isometric view of a palm cover as worn by a user, where the palm cover and straps are connected to a mobile computer device with corner extenders.
Figure 6:
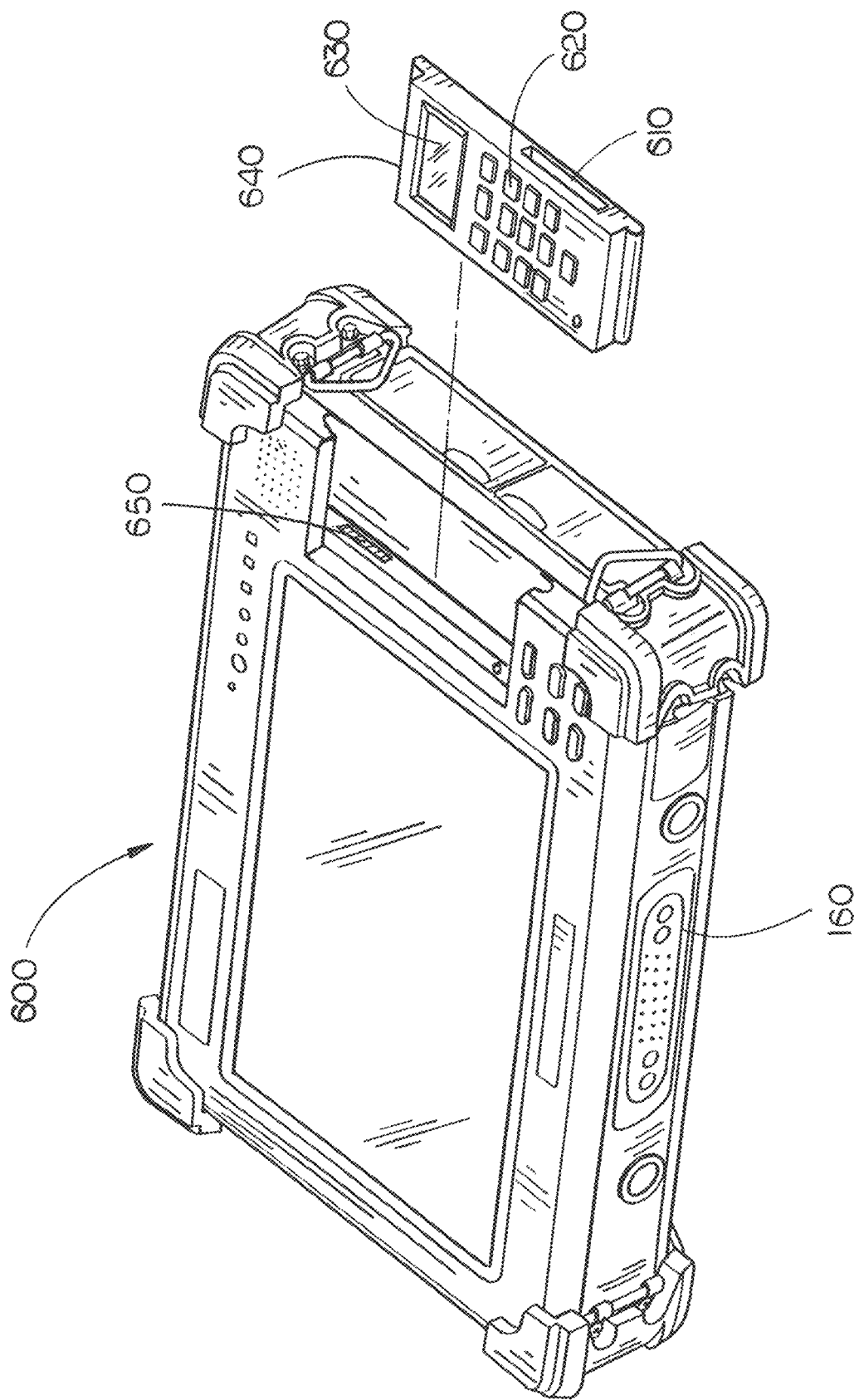
FIG. 6 is an isometric view of a mobile computing device and a separate plug-in Personal Information Number (PIN) Entry Device (PED) module with card slot.
Figure 7:
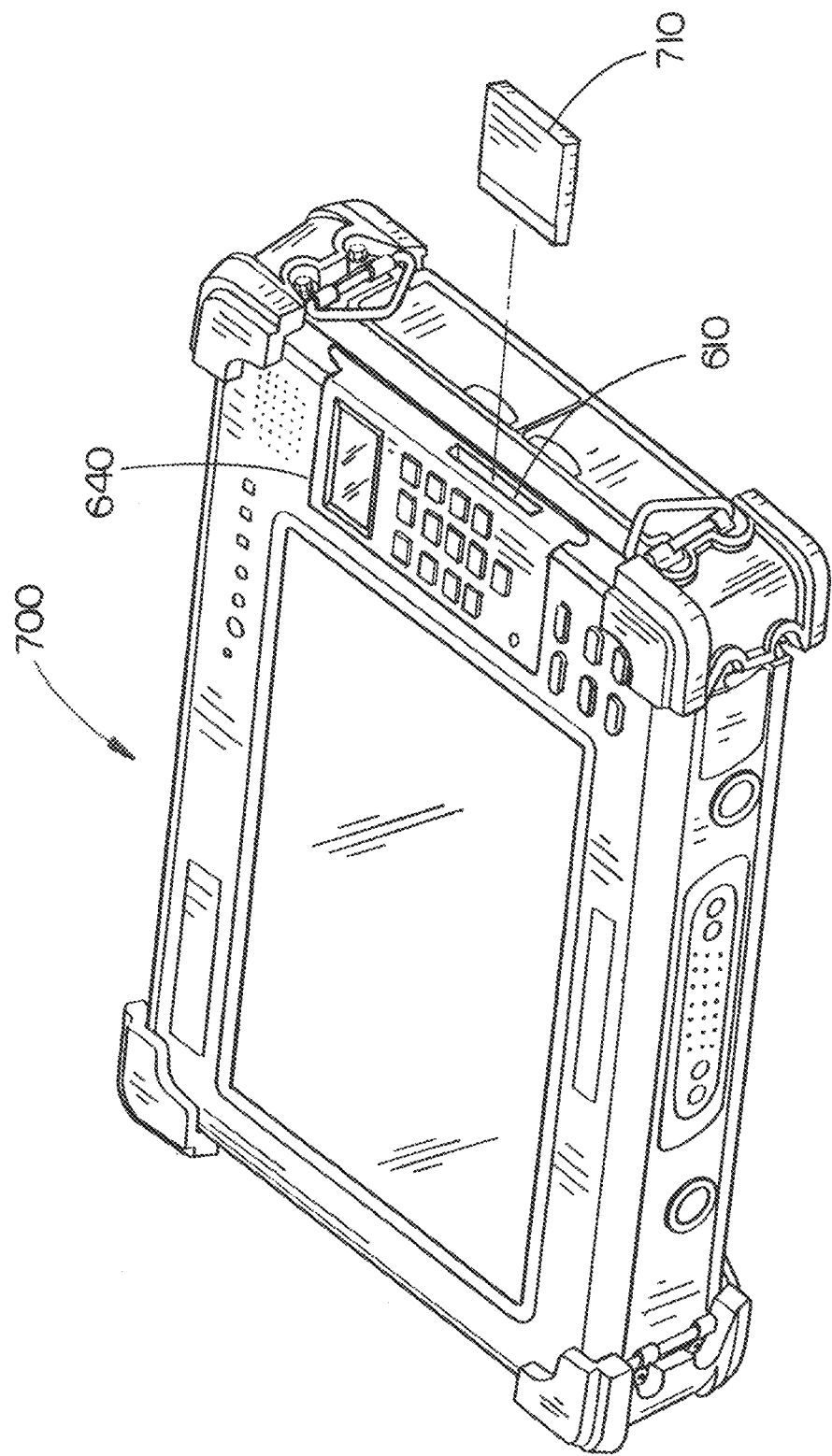
FIG. 7 is an isometric view of a mobile computing device and an inserted plug-in PED module with card slot.
Figure 8:
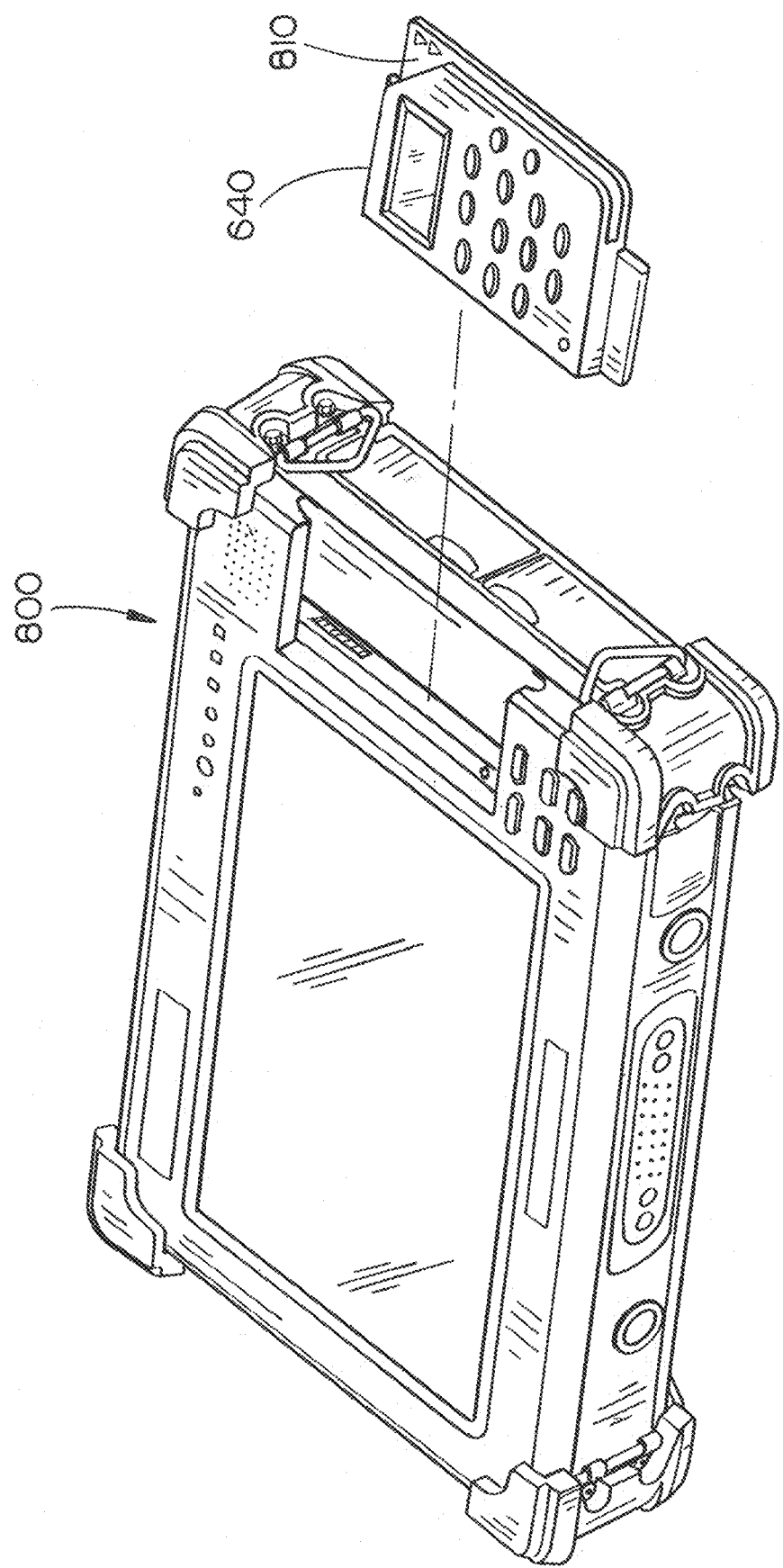
FIG. 8 is an isometric view of a mobile computing device and a separate plug-in PED module with swipe slot.
Figure 9:
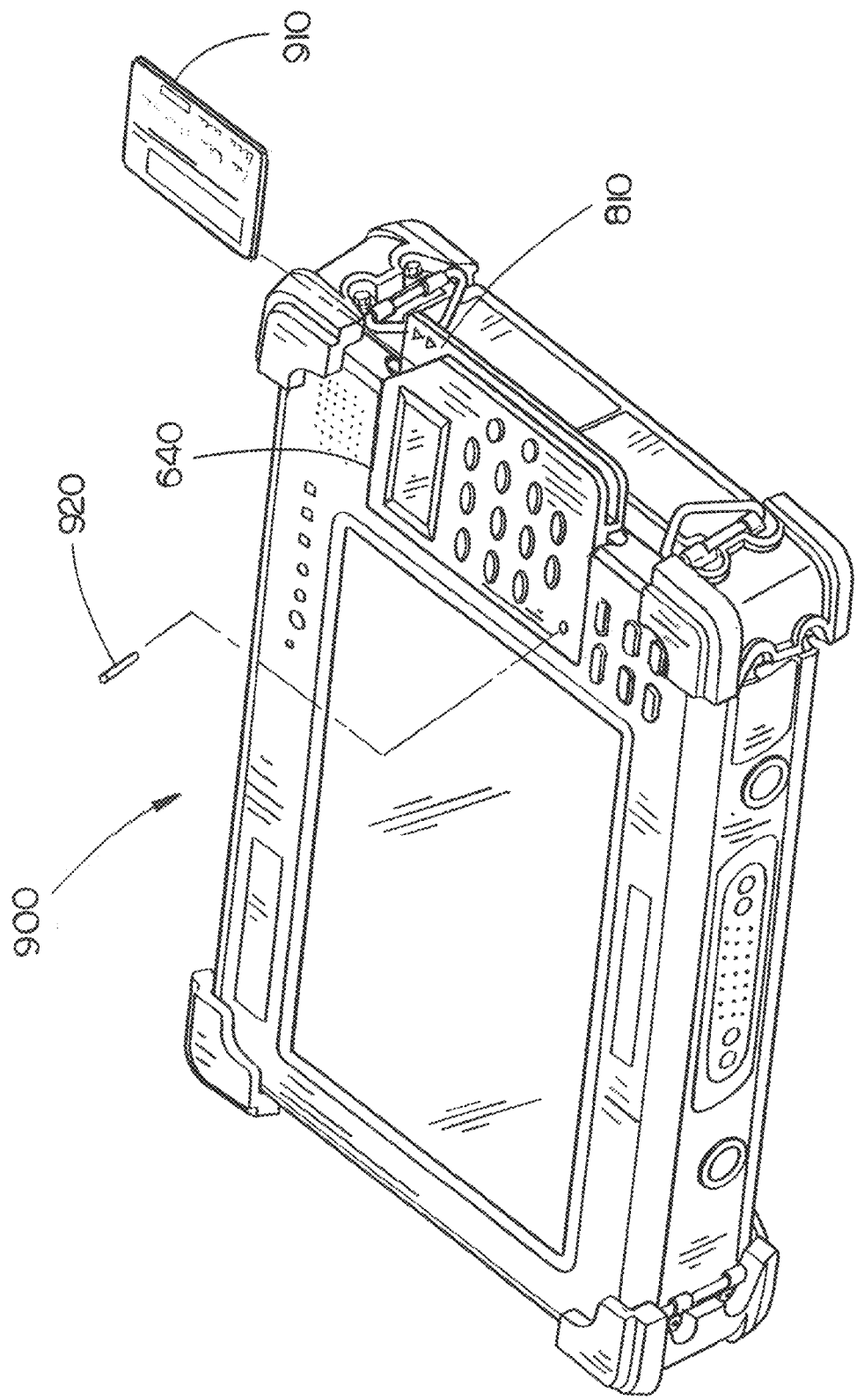
FIG. 9 is an isometric view of a mobile computing device and an inserted plug-in PED module with swipe slot.

Referring generally to FIGS. 4-5, illustrations 400-500 are shown of a palm cover 430 for a mobile information handling apparatus for partially covering the palm of a user of the mobile computing device. Palm cover 430 may be made of a flexible or malleable material such as leather, fabric, plastic, or any other suitable material. The hand of a user may be inserted within the palm cover 430 substantially between an inside layer and an outside layer. Palm cover 430 may be ambidextrously designed. Further, fingers of a user may extend outside the palm cover 430. Palm cover 430 may include a plurality of openings 440 configured for receiving one or more straps 410 of the carrying assembly. For example, openings 440 may be comprised of cuts in both the inside layer and the outside layer of the flexible or malleable material of the palm cover 430. Openings 440 may be reinforced for preventing the cuts from widening due to usage/wear and tear. For example, the openings 440 may be surrounded by stitching, inserts, or the like to inhibit damage to the palm cover 430 during use. Openings 440 may be sized to accommodate a variety of sizes of straps 410.

Additionally, openings 440 may be angled to be substantially perpendicular to a diagonal of the back cover of the mobile computing device 110. Openings 440 may be symmetrically located on an outside layer of palm cover proximal to the back of the hand of a user. Also, openings 440 may be located on an inside layer of palm cover 430 proximal to the palm of a user. Preferably, one or more straps 410 may thread through openings 440 either through the inside layer of palm cover 430 adjacent to a user's palm or the outside layer of palm cover 430 adjacent to a user's back hand.

The openings 440 may be configured for multiple straps 410 of the carrying assembly. For example, a first set of openings may be configured for a first strap oriented along a first diagonal of the back cover. A second set of openings may be configured to simultaneously receive a second strap oriented along a second diagonal of the back cover. Palm cover 430 may be attached to mobile computing device 110 via one or more of a first strap passing through a first set of openings of the palm cover for attaching closing hook fasteners of the first strap around strap attachment points, and/or a second strap passing through a second set of openings of the palm cover for attaching closing hook fasteners of the second strap around strap attachment points. Palm cover 430 may distribute the weight of the mobile computing device 110 across the surface of a hand of a user of the mobile computing device.

Referring generally to FIGS. 6-11b, illustrations 600-1100 of a Personal Information Number (PIN) entry device (PED) module for a mobile computing device are shown. PED module may be fully data secured. Further, PED module may be certified by the Payment Card Industry (PCI). PED module may include a card slot 610 for insertion of a smart card 710. PED module may include a swipe slot 810 for reading of a magnetic-stripe card 910. PED module may include a keypad 620 for PIN entry. PED module may include a display 630 for conveying information to a user. In an embodiment, the display 630 may include a liquid crystal display capable of displaying two lines of sixteen characters. However, it is contemplated that other types of displays may be provided with more or fewer characters, and viewable areas of various sizes.

In an embodiment, a PED module may be a plug-in module 640. Plug-in PED module 640 may interface with the mobile computing device via a series of tabs and grooves in the cover of the PED module 640 or the cover of the mobile computing device, or both the cover of the PED module 640 and the cover of the mobile computing device. Plug-in PED module 640 may connect to a secure data connector 650 within the mobile computing device when coupled with the mobile computing device. A secure data connector 650 may provide communicative coupling between the PED module 640 and the main printed circuit board (PCB) of the mobile computing device. A securing assembly may be utilized to secure plug-in PED module into the mobile computing device. For example, at least one lock screw 920 may be inserted into the plug-in PED module and the mobile computing device.

Figure 10A:
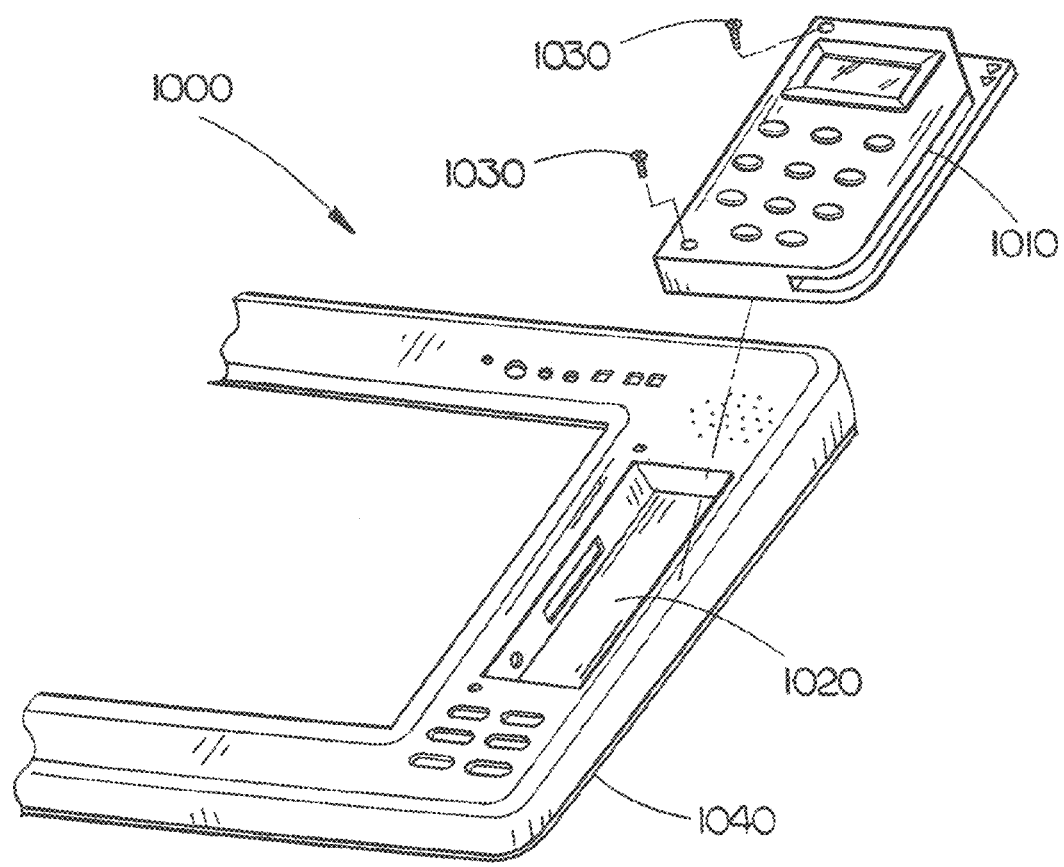
FIG. 10A is an exploded isometric front view of a front cover of a mobile computing device and a separate top cover sub-assembly PED module with swipe slot.
Figure 11A:
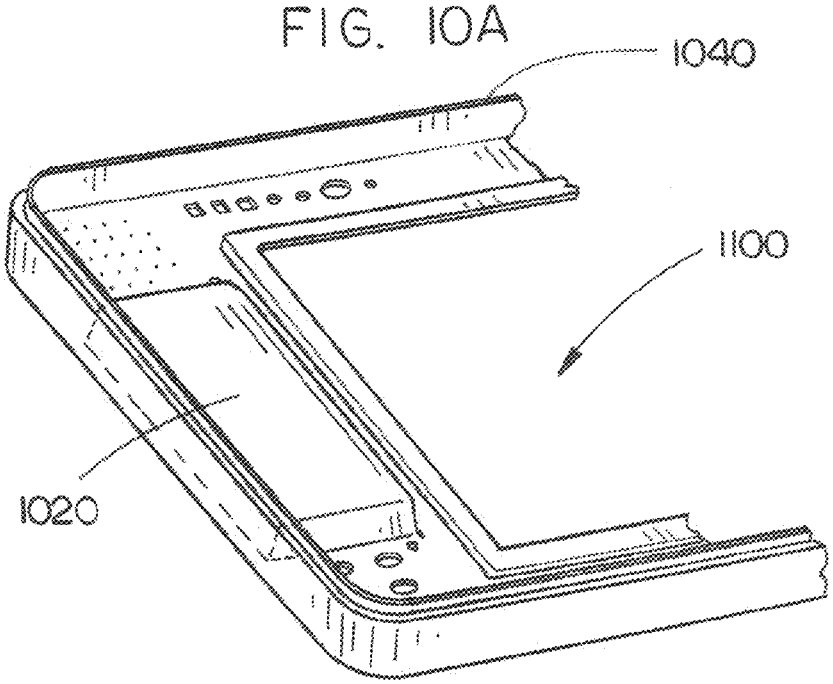
FIG. 11A is an isometric rear view of a front cover of a mobile computing device.

Referring to FIGS. 10a and 11a, an alternate embodiment of a PED configuration is shown. A PED module may be integrated into a top cover sub-assembly of the mobile computing device. The PED module may include a top cover portion 1010 (ex—module cover piece) attached to the top cover of the mobile computing device via a plurality of screws 1030. Top cover portion 1010 of PED module may encapsulate the PIN secure electronics of PED module. Top cover 1040 of the mobile computing device may include a recessed area 1020 located on the underside of the top cover. Recessed area 1020 of the top cover 1040 may be located adjacent to top cover portion 1010 of PED module. Recessed area 1020 of the top cover 1040 may include a secure data connector. PIN secure electronics may include a connector for communicating data. Secure data connector may provide communicative coupling between the PED module and the main printed circuit board (PCB) of the mobile computing device.

Figure 10B:
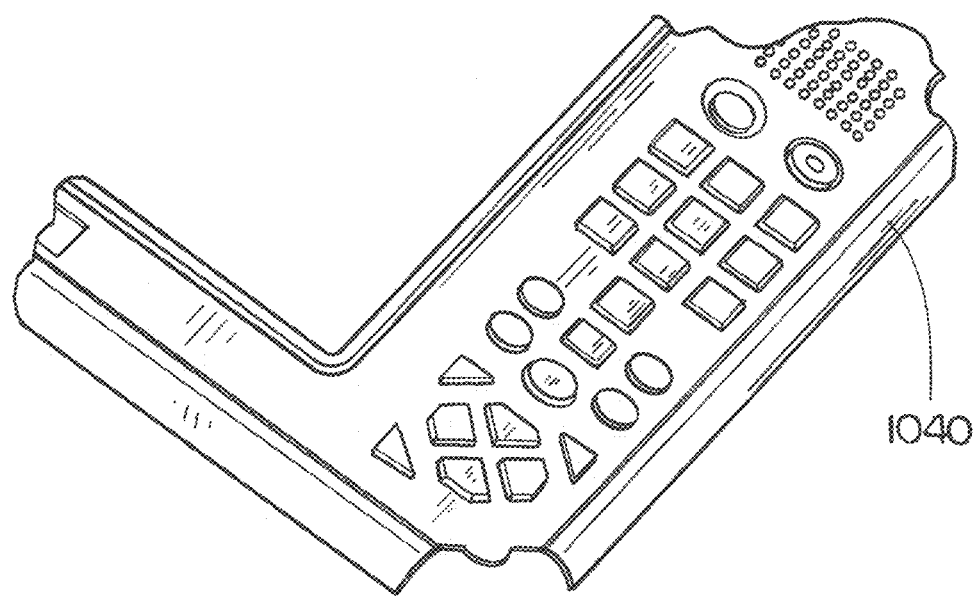
FIG. 10B is an isometric front view of a single piece front cover of a mobile computing device configured for secure data entry.

In one embodiment, an enhanced security standard PED module may be integrated into a top cover sub-assembly of the mobile computing device. FIG. 10b shows an embodiment of the current invention showing a top cover 1040 constructed of a single piece of material. The PIN secure electronics portion may be seen in proximity to top cover 1040. Should top cover 1040 become breached, the function of PIN secure electronics may be designed to become inoperative. Such Security standard may enable an embodiment to conform to consumer acceptable security standard such as a Payment Card Industry Data Security Standard (PCI DSS).

Figure 11B:
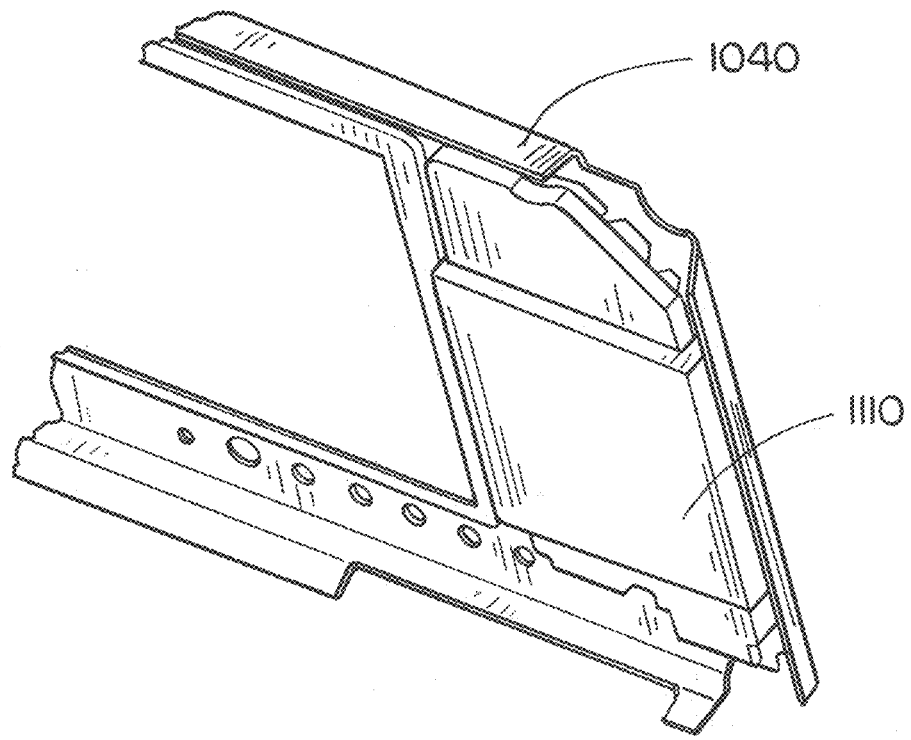
FIG. 11B is an isometric rear view of a single piece front cover of a mobile computing device configured for secure data entry with an enclosed keypad.
Figure 12:
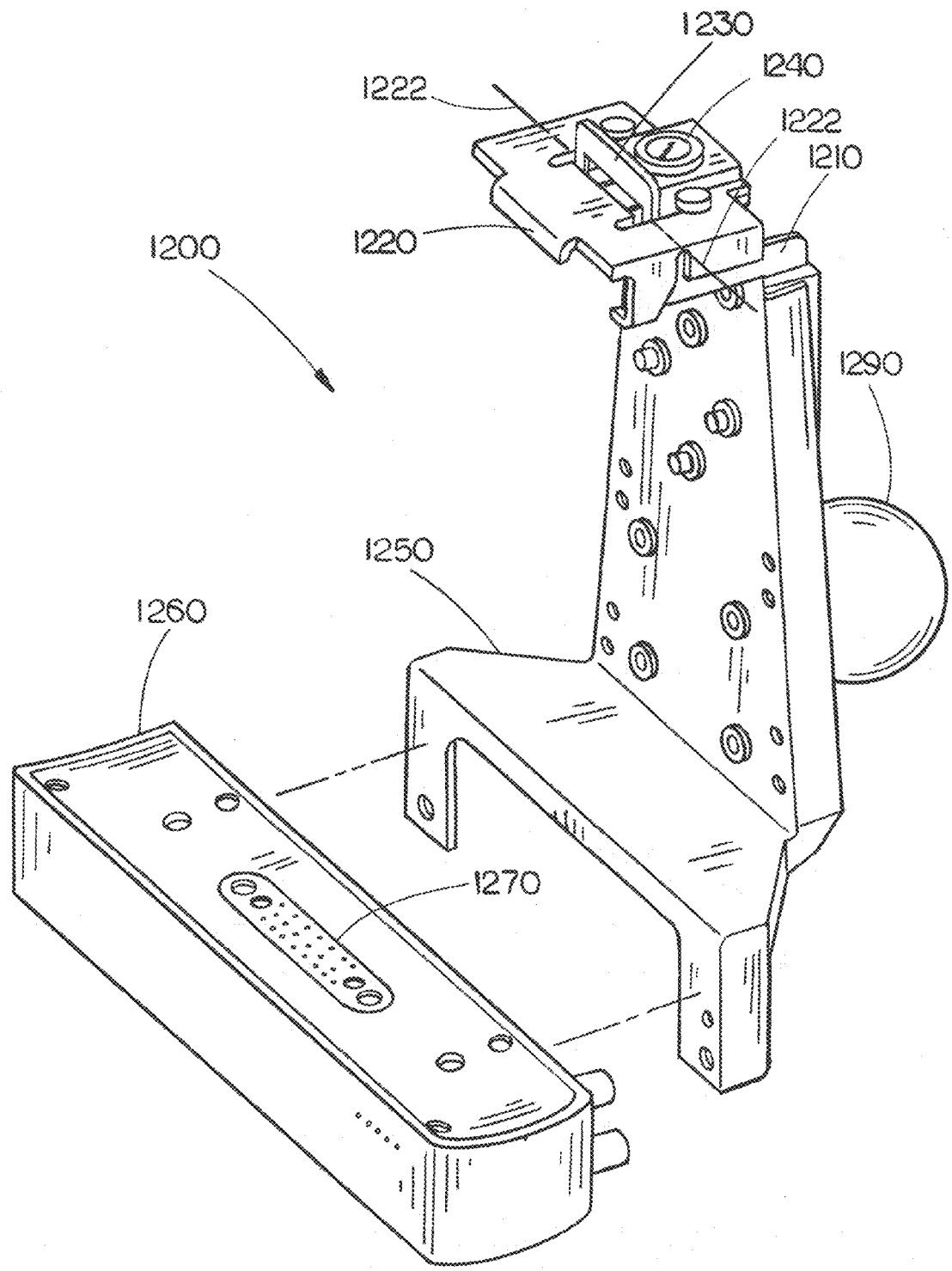
FIG. 12 is an exploded isometric view of an adjustable dock including a communications portion.
Figure 13:
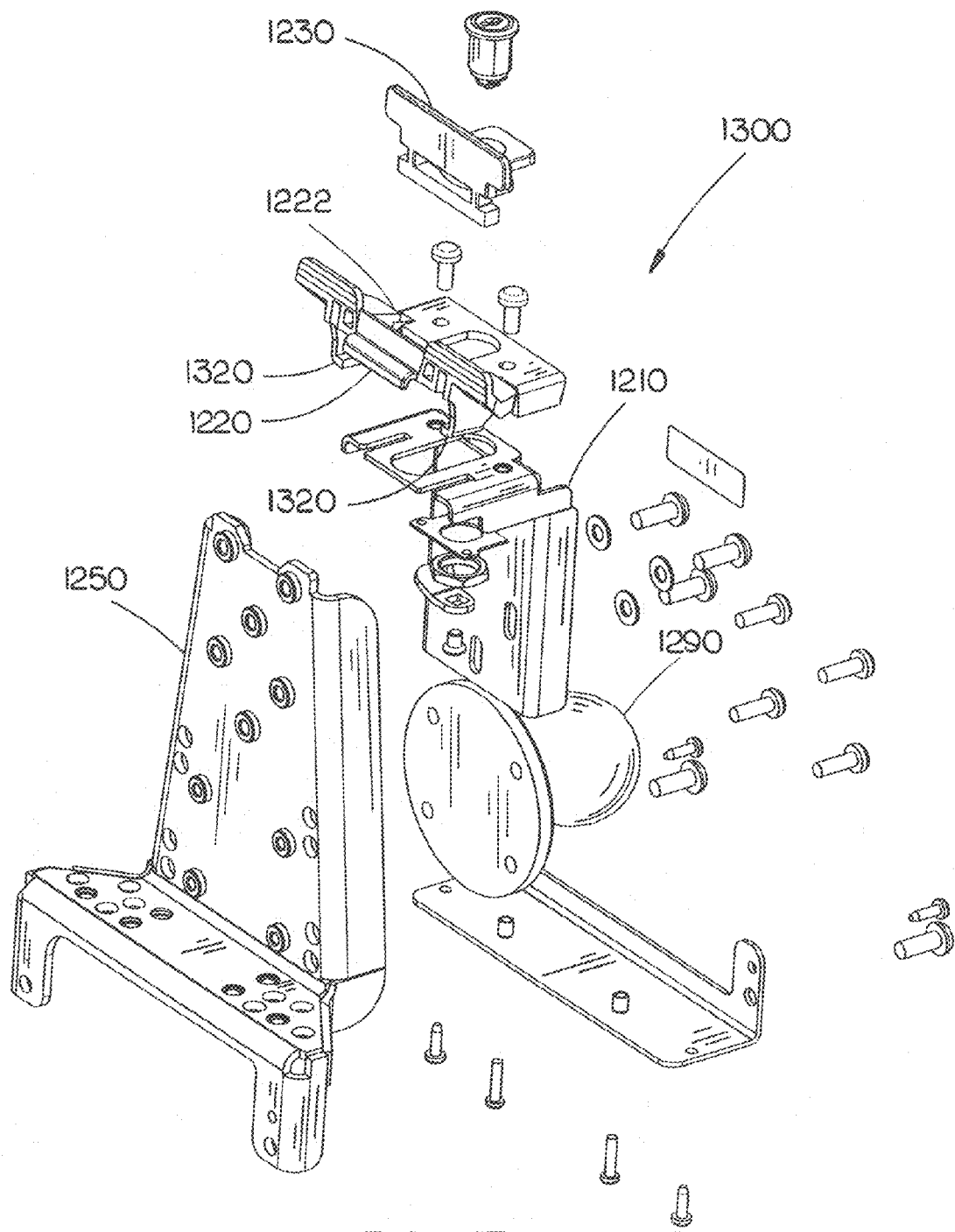
FIG. 13 is an exploded view of the adjustable dock illustrated in FIG. 12 excluding the communications portion.
Figure 14:
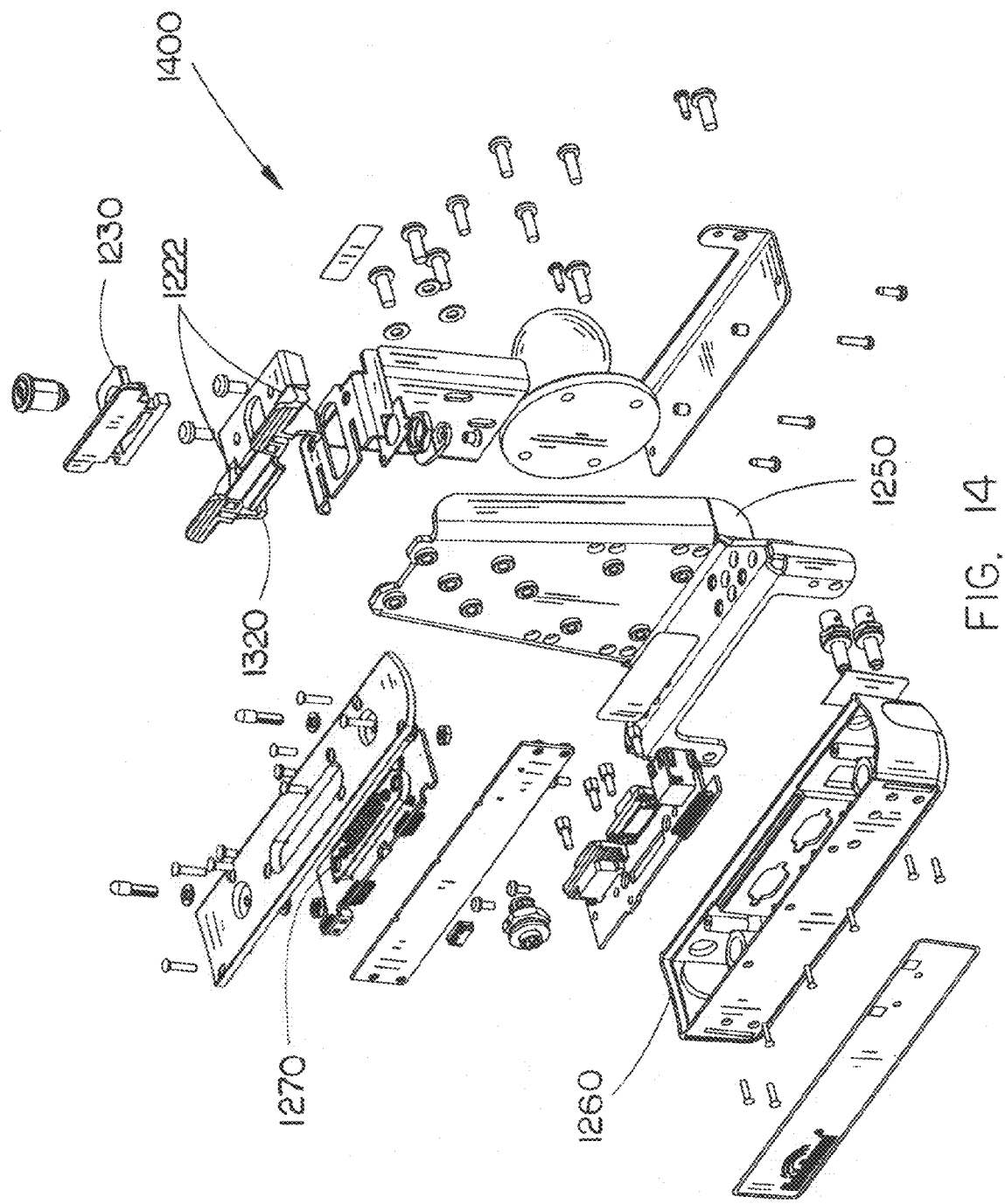
FIG. 14 is an exploded view of an adjustable dock.
Figure 15:
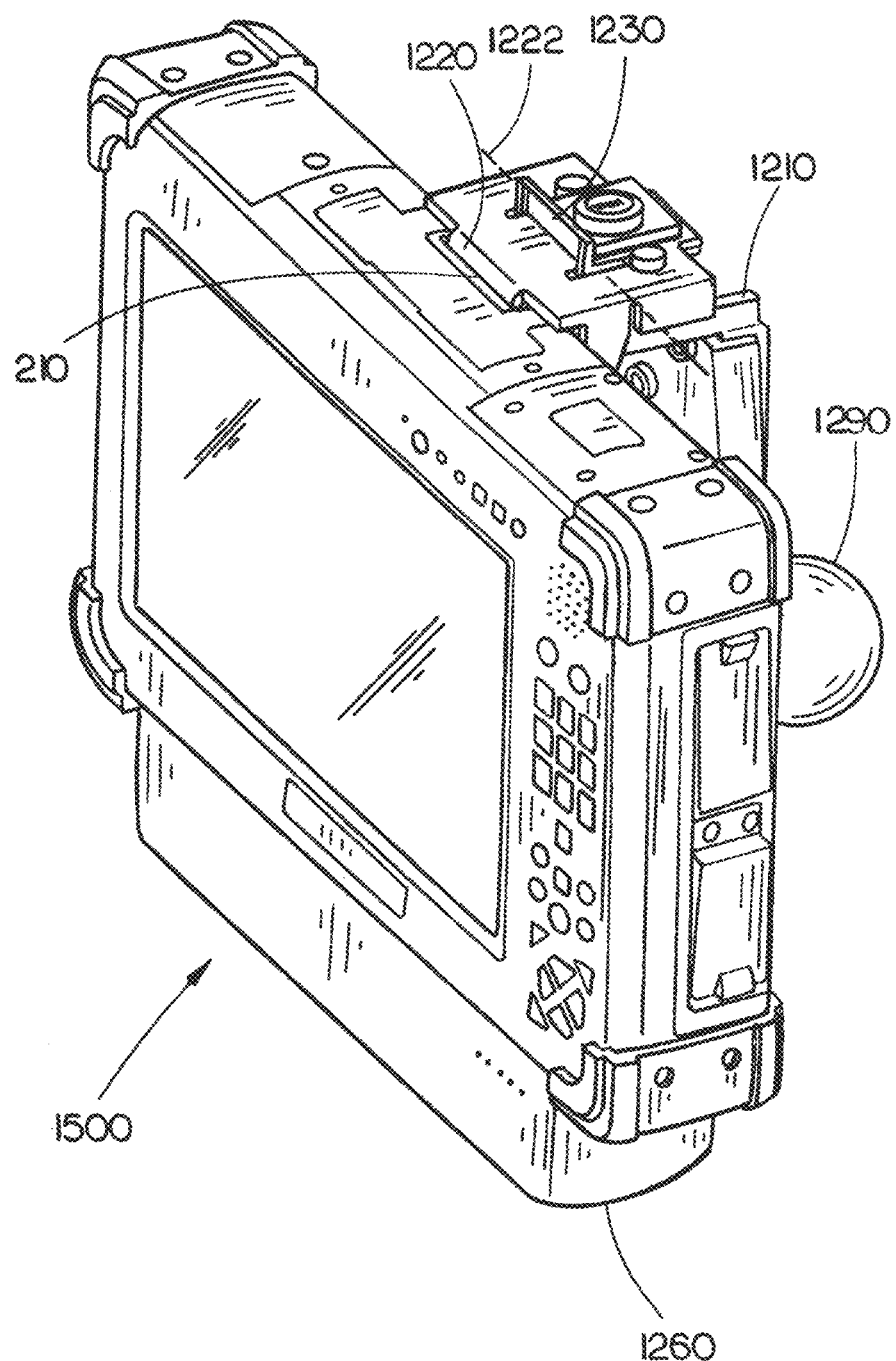
FIG. 15 is an isometric front view of a mobile computing device mounted in an adjustable dock.
Figure 16:
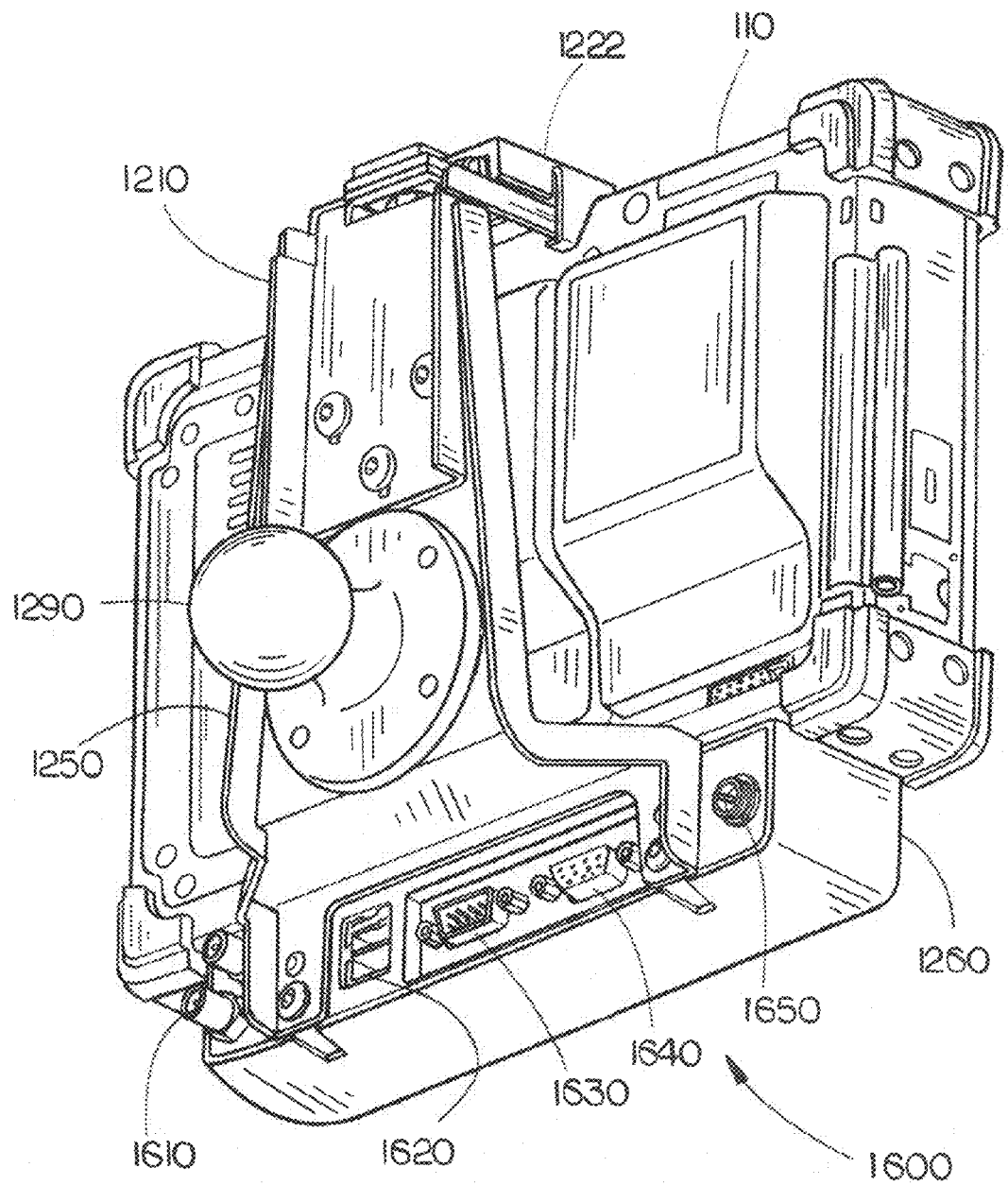
FIG. 16 is an isometric rear view of a mobile computing device mounted in an adjustable dock.
Figure 17:
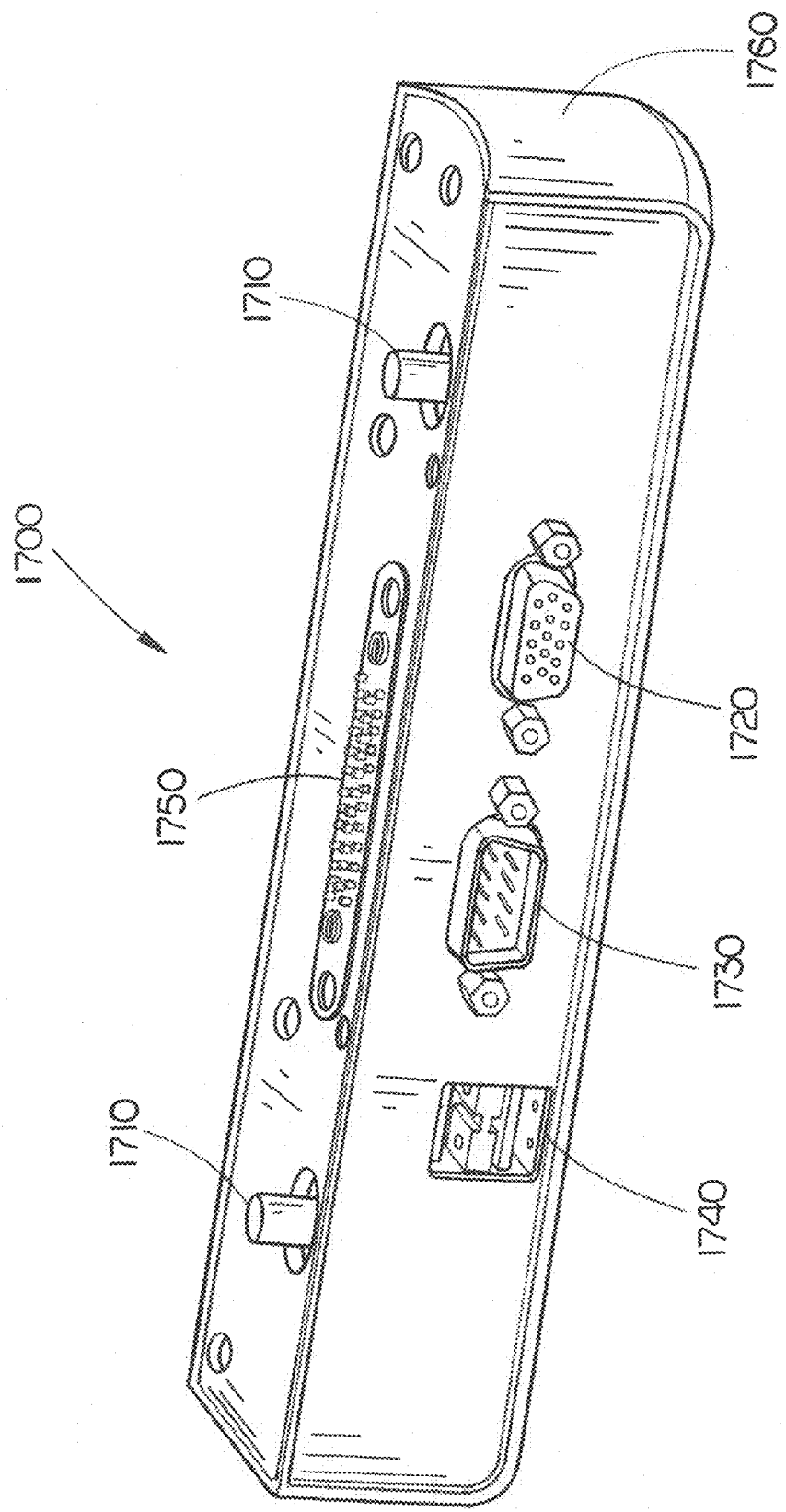
FIG. 17 is an isometric rear view of the keyboard input/output (I/O) device.
Figure 18:
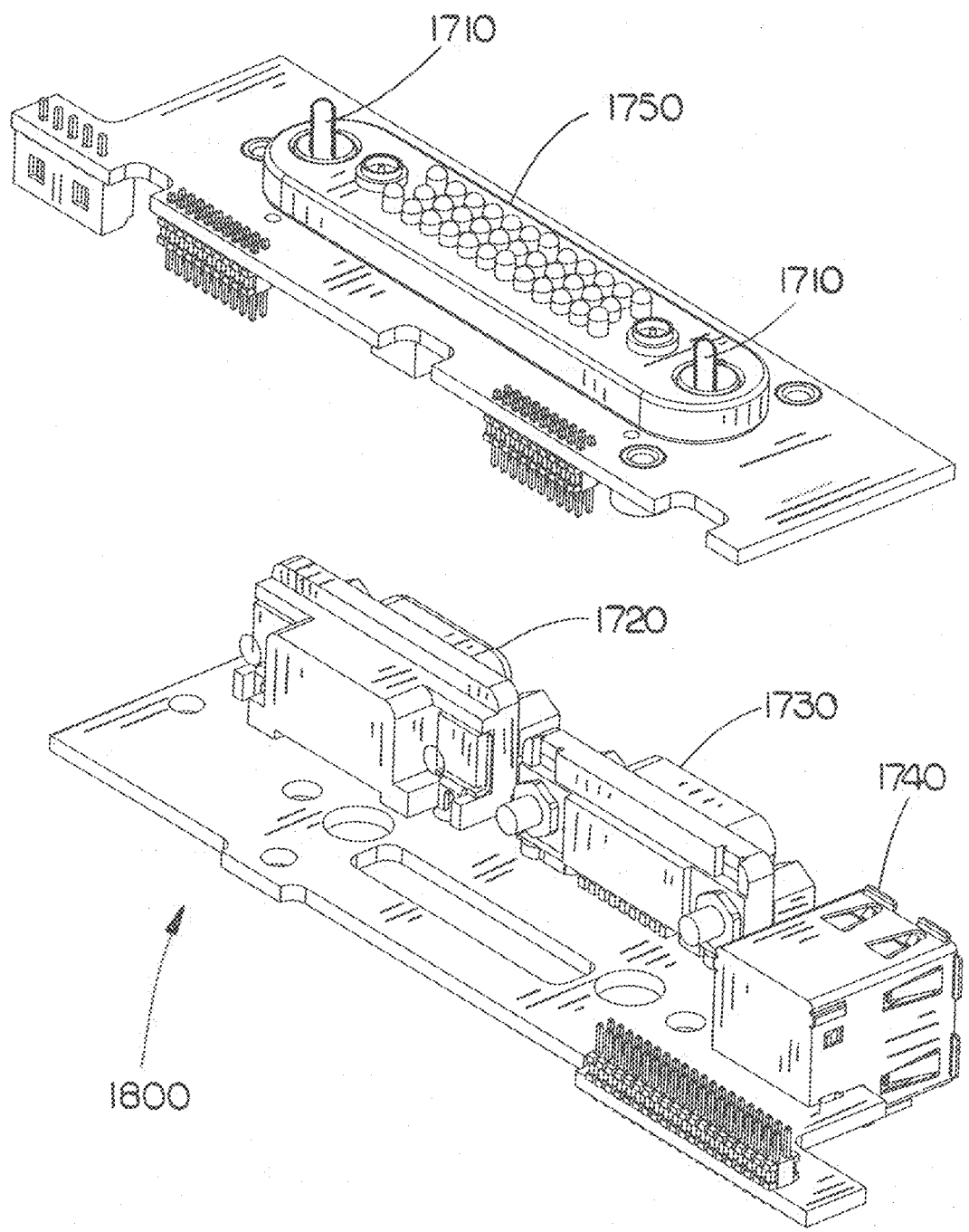
FIG. 18 is an exploded view of circuit board sub-assemblies of a data port and expansion connectors of the keyboard I/O device.
Figure 19:
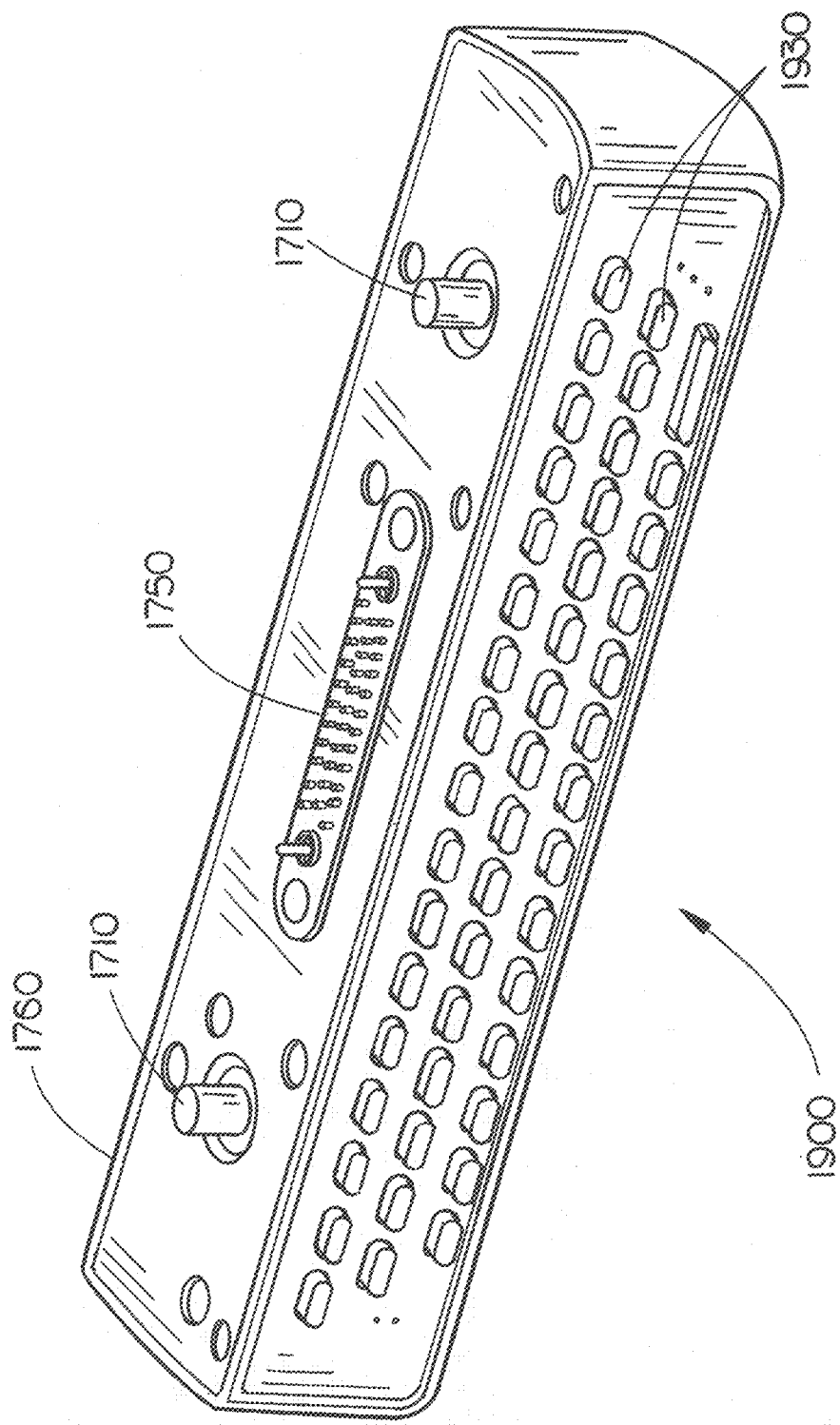
FIG. 19 is an isometric front view of a keyboard I/O device.

FIG. 11b displays an opposite side of the display in FIG. 10b. PIN secure electronics 1010 may be fully enclosed within a keypad enclosure panel 1110. Opposite of top cover 1040, and configured to surround the keypad, keypad enclosure panel 1110 may fully enclose the PIN secure electronics. It is contemplated the information normally displayed on a typical PIN module 2-line display will here be displayed in a secure dialog box on the main tablet screen. PIN secure electronics may be configured to communicate with software or firmware of the computing device creating an integrated security system for the computing device. In this embodiment, since top cover 1040 is constructed of the single piece of material, the use of an attached smart card slot or magnetic card reader functions will not be compatible here. It is further contemplated wireless card reader devices may be incorporated with this embodiment.

Referring generally to FIGS. 12-16, illustrations 1200-1600 of an adjustable dock for mounting the mobile computing device 110 are shown.

Adjustable dock may include a securing portion 1210 for securing the mobile computing device. Securing portion 1210 may further include one or more lock tabs 1220 for inserting into one or more slots 210 of the mobile computing device while the mobile computing device is mounted in the adjustable dock. The one or more lock tabs 1220 may be comprised of a flexible material which substantially returns to an original position after flexing. The one or more lock tabs 1220 may have a locking portion and a stationary portion. The locking portion of the one or more lock tabs 1220 coupled to the stationary portion of the one or more lock tabs 1220 via a point of inflection 1222.

Securing portion 1210 may further include a sliding portion 1230 for exerting and releasing leverage on the one or more lock tabs 1220. For example, the sliding portion 1230 may be moved, through grooves in the one or more lock tabs 1220, into a first position to 1) exert leverage on the locking portion of the one or more lock tabs 1220, 2) direct the locking portion of the one or more lock tabs 1220 into the one or more slots 210 of the mobile computing device and 3) lock in place the one or more lock tabs 1220. Further, the sliding portion 1230 may be moved into a second position to 1) release the leverage on the locking portion of the one or more lock tabs 1220 and 2) allow the locking portion of the one or more lock tabs 1220 to flexibly and rotationally exit the one or more slots 210 of the mobile computing device. The locking portion of the one or more lock tabs 1220 may flexibly rotate about the point of inflection 1222 to the first position securely in place into the one or more slots of the mobile computing device 210 and away from the one or more slots 210 into the second position. However, the locking portion of the one or more lock tabs 1220 may rotate away from the computing device about the point of inflection 1222 to a maximum angle as held by hooks 1320. The hooks 1320 engage securing portion 1210 to inhibit the locking portion of the one or more lock tabs 1220 from excessive rotation while sliding portion 1230 is in the second position. Additionally, the stationary portion of the one or more lock tabs 1220 may be coupled to the securing portion 1210 via fasteners, screws or the like. Securing portion 1210 may include a locking mechanism 1240 including a cylindrical cam lock (or another type of lock) for fixing the sliding portion 1230 in the first position.

Adjustable dock may include a support portion 1250 for supporting the mobile computing device. Support portion 1250 may include a communications portion 1260 for docking the mobile computing device. Communications portion 1260 may include one or more docking pins 1710 for fixing the relative locations of the communications portion 1260 and an object proximal to the communications portion. For example, the mobile computing device 110 may include one or more positioning locations 170 for insertion of one or more docking pins 1710. In an alternate configuration, the location of the pins and the positioning locations may be reversed. Communications portion 1260 may include a first data port 1270 for creation of a physical connection between the first data port 1270 of the communications portion 1260 and a data port of an object (such as an expansion data port 160 of computing device) proximal to the communications portion 1260. The communications portion 1260 may include data connection ports configured for a plurality of data types. tonr one or more expansion connectors to provide access to the mobile computing device while the mobile computing device is mounted within the adjustable dock. For example, expansion connectors may include one or more of Universal Serial Bus (USB) ports 1620, Radio Frequency (RF) connectors, serial bus ports 1630, Video Graphics Array (VGA) connections 1640, Bayonet Neill-Concelman (BNC) coaxial connectors 1610, or coaxial cable connectors. Expansion connectors may be utilized for data input/output, signal reception/transmission (ex—connection to an antenna), or battery charging through a connection to a power supply 1650. It is contemplated other connector types may be used in addition to the enumerated list above.

The support portion 1210 may be configurable in two or more positions. A first position of the support portion may support the mobile computing device 110 proximal to the communications portion 1260. An expansion data port 160 of the mobile computing device 110 may create a first physical connection with the first data port 1270 of the communications portion 1260 when the support portion is configured in the first position and the mobile computing device is mounted in the adjustable dock.

A second position of the support portion may be configured to support the mobile computing device a distance away from the communications portion 1260 for docking an input/output (I/O) device between the mobile computing device 110 and the communications portion 1260. The expansion data port 160 of the mobile computing device may create a second physical connection between the expansion data port 160 and a first data port of the I/O device when the support portion is configured in the second position and the mobile computing device and the I/O device are mounted in the adjustable dock. The first data port 1270 of the communications portion 1260 may create a third physical connection between the first data port 1270 of the communications portion 1260 and a second data port of the I/O device when the support portion is configured in the second position and the mobile computing device and the I/O device are mounted in the adjustable dock. The physical connections of the adjustable dock and the mobile computing device may be utilized for both power and data connections.

Adjustable dock may include a mounting portion 1290 for mounting to a base. For example, mounting portion 1290 may include a standard ball component for insertion into a base. Mounting portion 1290 may be mounted to either support portion 1250 or securing portion 1210. The base may be configured to securely fix the mounting portion 1290 in a plurality of positions and at a plurality of angles.

Referring generally to FIGS. 17-22, illustrations 1700-2200 of a keyboard I/O device 1760 for accessing the mobile computing device are shown.

Keyboard I/O device 1760 may be configured to be located between the communications portion 1260 of the adjustable dock and the mobile computing device 110 when the support portion of the adjustable dock is configured in the second position. Keyboard I/O device 1760 may include a computer data port 1750 and a dock data port 2010. Computer data port 1750 may create a physical connection between the expansion data port of the mobile computing device and the computer data port 1750 of the keyboard I/O device 1760. Dock data port may create a physical connection between the first data port of the communications portion 1260 and the dock data port of the keyboard I/O device. Dock data port may be of a similar design and configuration as expansion data port 160. Communications portion 1260 of the adjustable dock may access the mobile computing device via the keyboard I/O device and the physical connections between the communications portion of the adjustable dock and the keyboard I/O device, and the physical connections between the keyboard I/O device and the mobile computing device.

Keyboard I/O device 1760 may include a plurality of keys 1930 for data entry to mobile computing device via the third data port of the mobile computing device and the fourth data port of the keyboard I/O device. Plurality of keys 1930 may be configured in a standard keyboard layout. For example, plurality of keys may be configured in a QWERTY or QWERTY-based keyboard layout. Plurality of keys may further include modifier keys. The physical connections of the keyboard I/O device may be utilized for both power and data connections. Keyboard I/O device may include one or more keyboard pins 1710 for fixing the relative locations of the keyboard I/O device 1760 and the mobile computing device 170. The mobile computing device may include one or more positioning locations 170 for insertion of one or more keyboard pins 1710. In an alternate configuration, the location of the pins and the positioning locations may be reversed.

Preferably, computer data port 1750 may have spring loaded coaxial connectors configured to accept an RF signal from the expansion data port of the mobile computing device. Further, keyboard I/O device may pass the RF signal to dock data port 2010. Dock data port 2010 may be configured to pass the RF signal to the first data port 1270 of the communications portion 1260. Further, communications portion 1260 may pass the RF signal to one or more expansion connectors 1610 on the communications portion 1260. Keyboard I/O device 1760 may further include data ports configured to route a data signal. Data ports may be configured for plurality of signals such as Ethernet 1740, serial male 1730 and serial female 1720.

Figure 20:
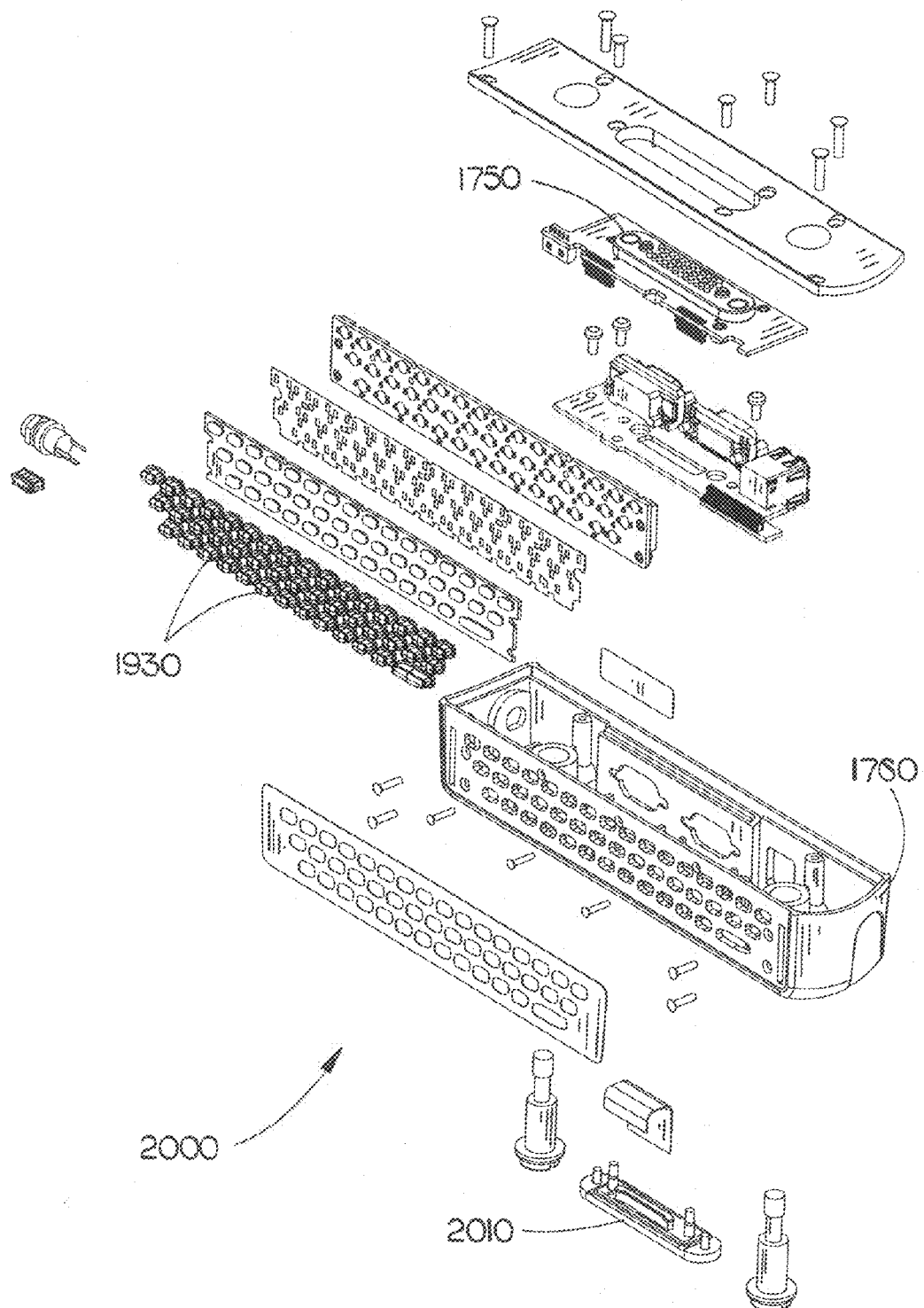
FIG. 20 is an exploded view of a keyboard input/output (I/O) device.
Figure 21:
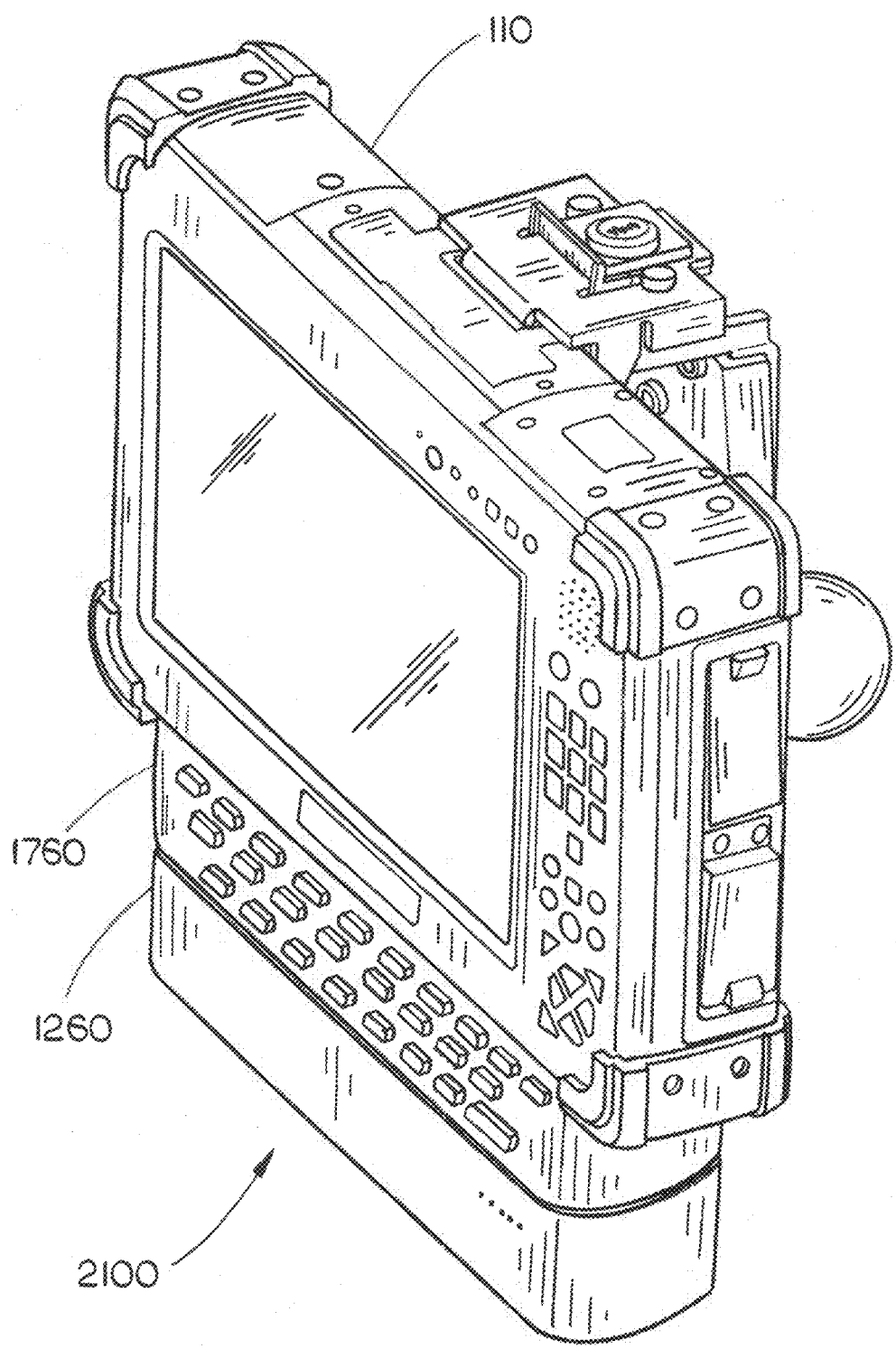
FIG. 21 is an isometric front view of a mobile computing device, keyboard I/O device, and communications portion mounted within an adjustable dock.
Figure 22:
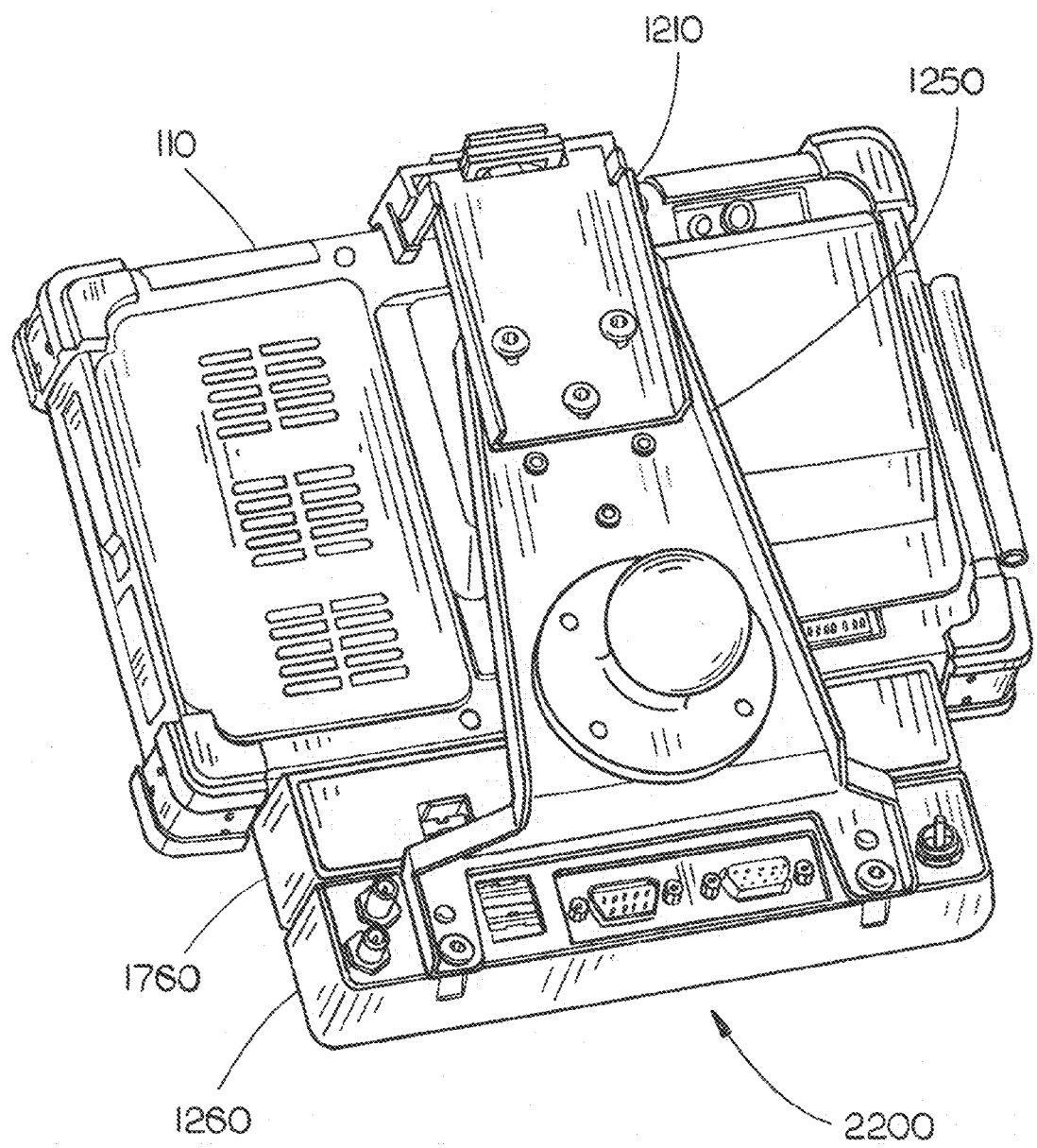
FIG. 22 is an isometric rear view of a mobile computing device, keyboard I/O device, and communications portion mounted within an adjustable dock.
Figure 23:
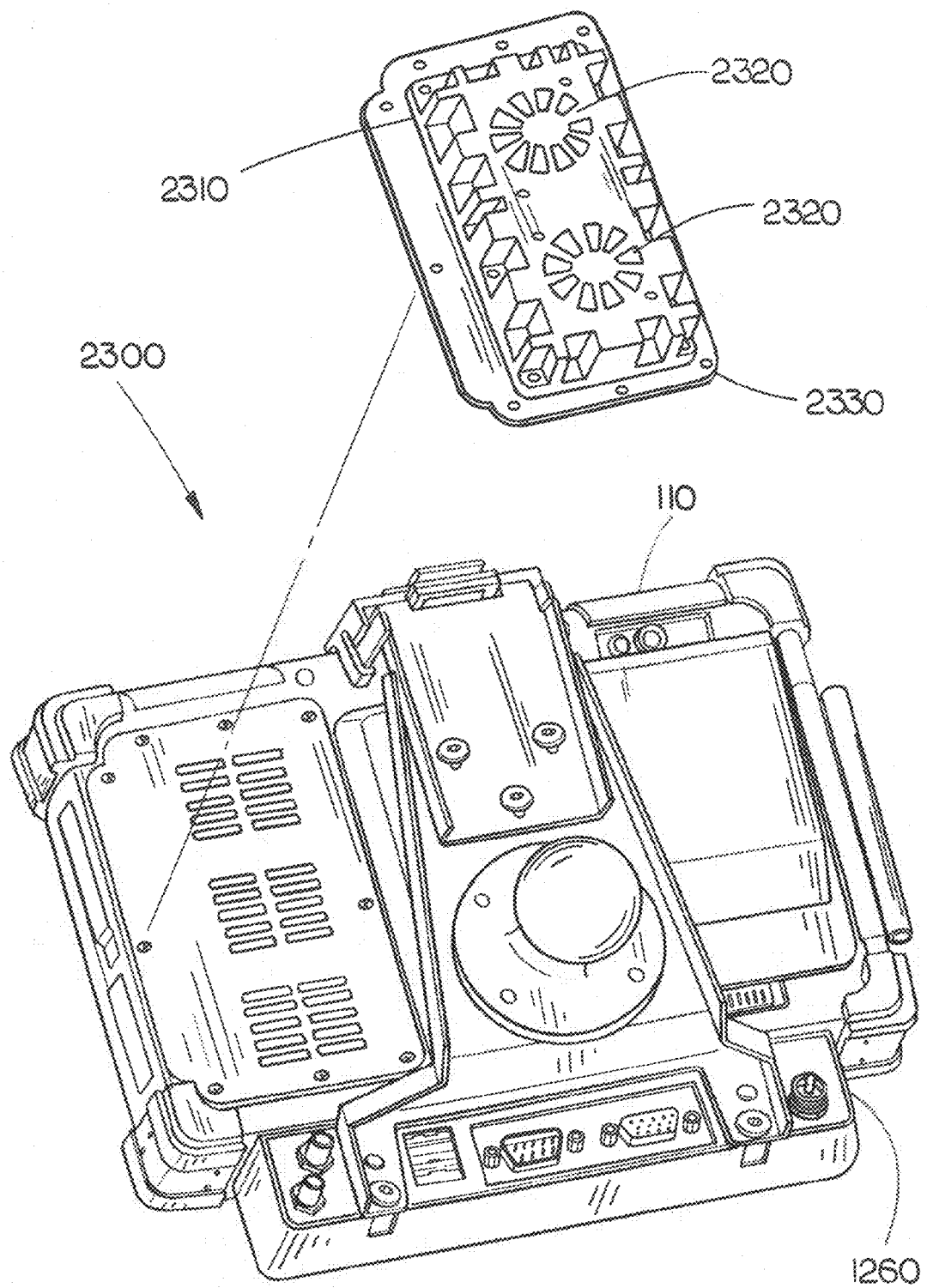
FIG. 23 is an isometric rear view of a mobile computing device mounted within an adjustable dock and a separate fan module.
Figure 24:
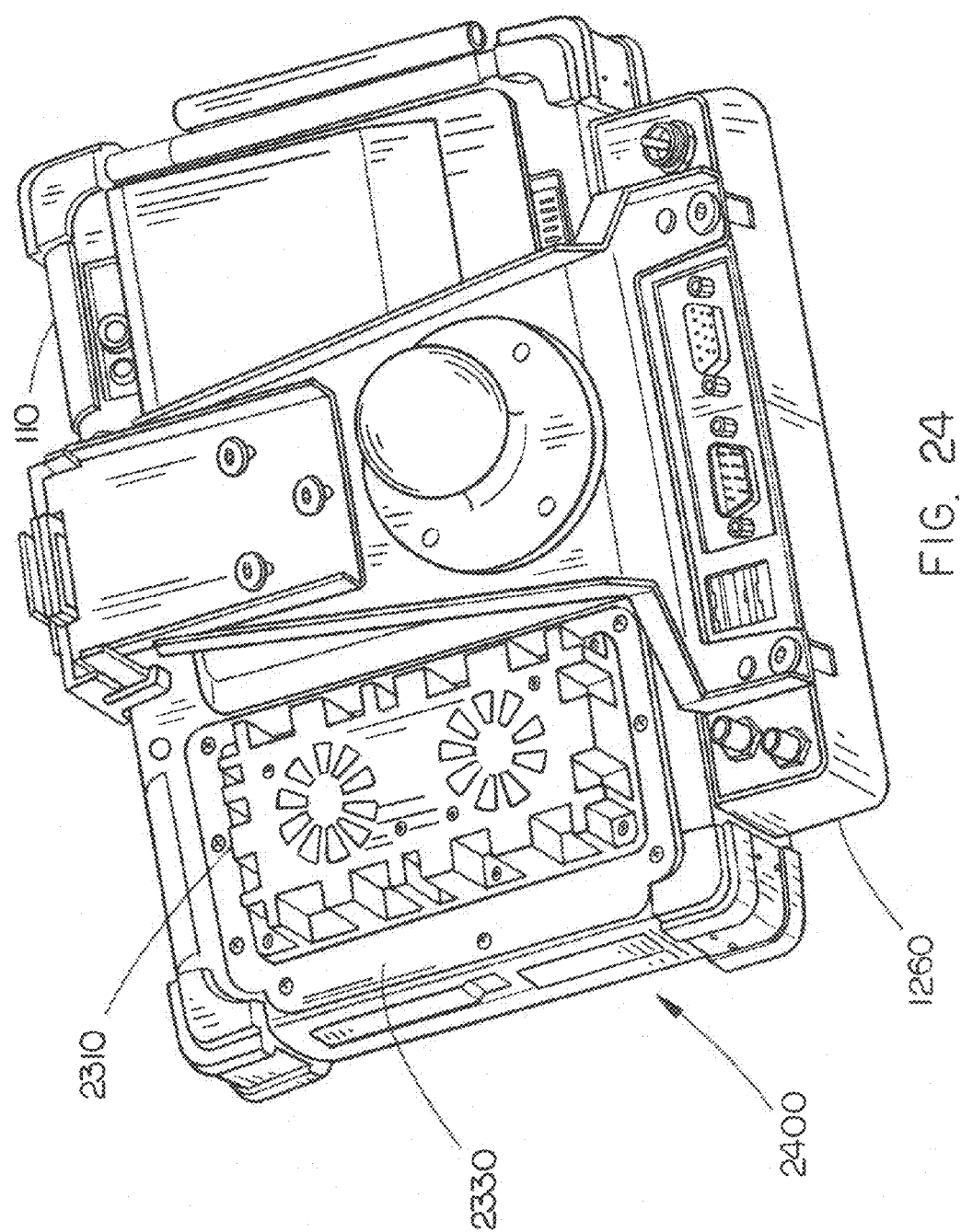
FIG. 24 is an isometric rear view of a mobile computing device mounted within an adjustable dock with a mounted fan module.

Referring to FIG. 20, it is further contemplated the keyboard I/O device 1760 may be incorporated within the communications portion 1260 forming a single peripheral mountable to the mobile computing device 110. In the first position of the support portion, the single peripheral may mount to the support portion and comprise functionality of the keyboard I/O device as well as the communication portion 1260.

Referring generally to FIGS. 23-26, illustrations 2300-2400 of a fan module 2310 configured for cooling the mobile computing device are shown. Fan module 2310 may include one or more fans 2320. The one or more fans 2320 may be integrated into a panel 2330 of the back cover of the mobile computing device. The one or more fans 2320 may extend outside the back cover of the mobile computing device. The fan module 2310 may be configured to allow mounting of the mobile computing device within the adjustable dock.

The fan module may be controlled by the mobile computing device. For example, the mobile computing device may utilize one or more of a Basic Input/Output System (BIOS) or an Extensible Firmware Interface (EFI) for a firmware interface. The BIOS or EFI may control the fan module. The fan module may operate at multiple duty cycle settings corresponding to various temperature settings. For example, a thermistor of the mobile computing device may provide temperature data for the BIOS or EFI. The BIOS or EFI may utilize the temperature data to control the fan module by varying the duty cycle of the fan module. There may be a plurality of duty cycle settings corresponding to a plurality of temperature ranges. For example, there may be a maximum temperature provided by the thermistor above which the BIOS or EFI may operate the fan module at a one hundred percent duty cycle. There may be a temperature range below the maximum temperature within which the BIOS or EFI may operate the fan module at a lower duty cycle. For example, there may be four temperature ranges corresponding to four duty cycles for the fan module. The four temperature ranges may be user-configurable. The BIOS or EFI may communicate with the fan module utilizing USB.

Figure 25:
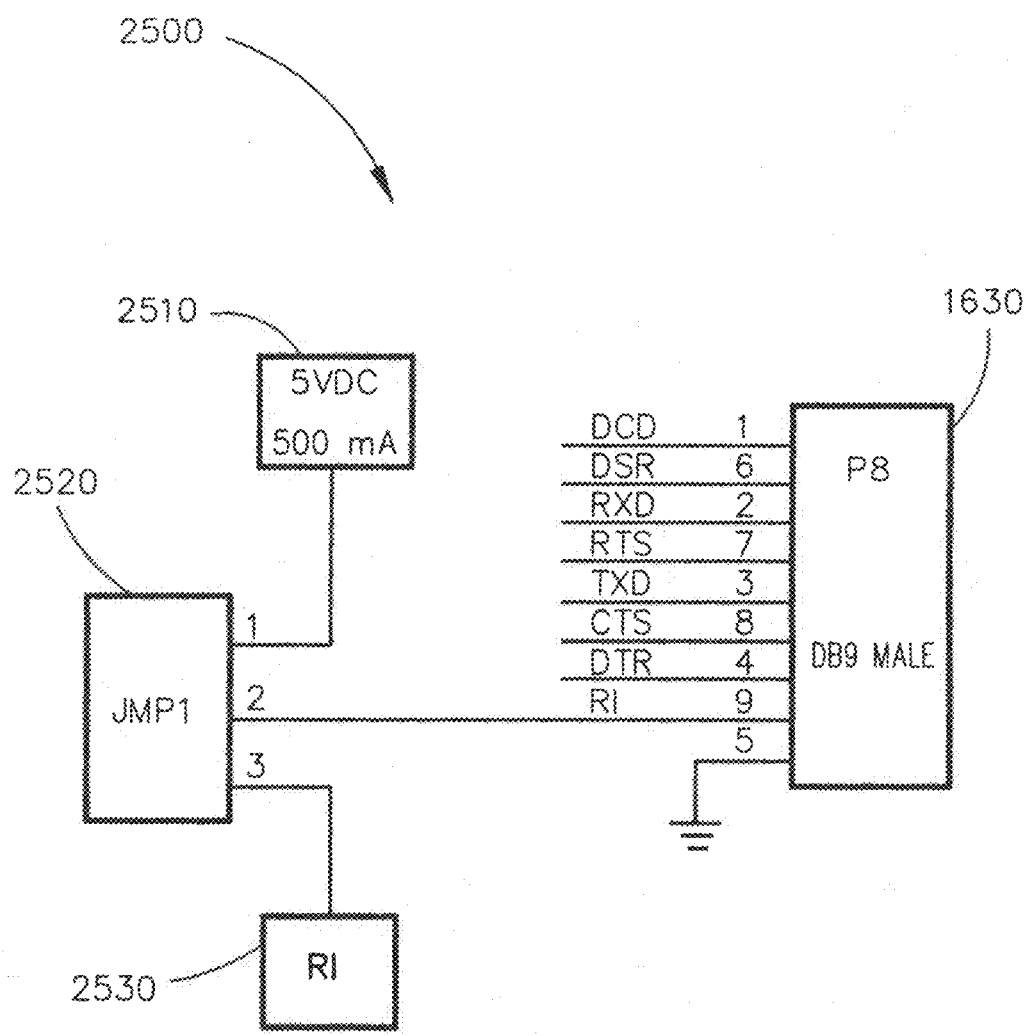
FIG. 25 is a schematic diagram of an alternate embodiment including a 3 pin jumper.

Referring to FIG. 25, in an additional embodiment, communications portion 1260 may be configured with an internal three pin jumper (JMP1) 2520 to enable either a power supply 2510 or Ring Indicate (RI) 2530 to be passed through pin 9 of male serial 1630. Such power supply 2510 may be configured for a plurality of devices connectable to communications portion 1260. Preferably, power supply 2510 may be 5 volts direct current at 500 milliamps to conform to probable device requirements.

Figure 26:
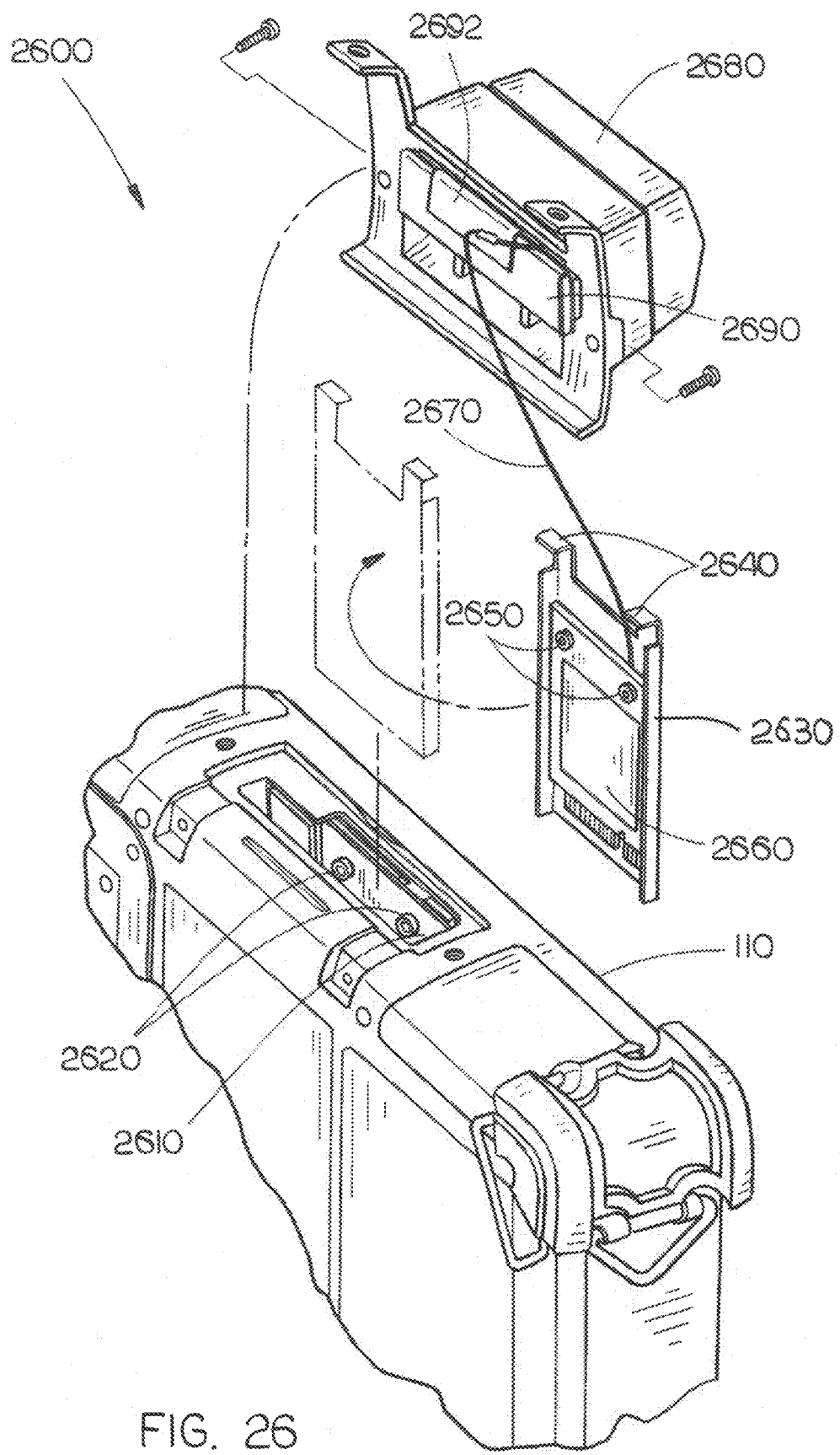
FIG. 26 is an isometric view of an additional embodiment including a communication antenna mounted on the computing device.

Referring to FIG. 26, in an additional embodiment, mobile information handling apparatus 110 may be configured with a communications antenna for communication with a wireless wide area network WAN, a wireless local area network W-LAN, a WI-FI network, and the like. A housing of mobile information handling apparatus 110 may be configured with cover 220 removed allowing access to the internal components of mobile information handling apparatus 110. Mobile device card slot 2610 may be exposed as a result of removal of cover 220. Normally, a Peripheral Component Interconnect Express (PCIe) card 2660 may be mounted in card slot using conventional methods of sliding the PCIe card into place and mounting the card 2660 to the slot 2610 via a set of screws 2620. In one embodiment, conductive cradle 2630 may be configured to slidably mount into card slot 2610. Further, conductive cradle 2630 may be configured to create a first connection and conduct a first signal (such as a grounding signal) between the mobile device 110, and the grounding portion 2690 of antenna 2680. Cradle 2630 may be constructed of well-known conductive material, in a preferred embodiment, Beryllium copper (BeCu) may be used to allow a positive electrical connection between the card slot of the mobile device and the grounding portion of the antenna. Such first signal may travel from card slot 2610 in the mobile device 110, through PCIe card 2660, through conductive connectors 2650, through the conductive cradle 2630, through tabs 2640, through conductive tape 2692, to grounding portion 2690. The first signal may make a complete connection when cradle 2630 is slidably mounted in PCB slot 2610 and antenna housing 2680 is mounted on mobile information handling apparatus 110 where conductive tape 2692 is in proximity with tabs 2640. In the mounted position, grounding portion 2690, conductive tape 2692, and tabs 2640 are in proximity.

Conductive cradle 2630 may be further configured with an insulated cable 2670 to create a second connection and transmit a second signal to the antenna. For example, an antenna signal may be transmitted from PCIe card to the antenna housing vie the insulated cable. Insulated cable 2670 may be coupled to PCIe card 2660 and routed in proximity to cradle 2630 to antenna housing 2680.

It is believed that the apparatus of the present disclosure and many of its attendant advantages will be understood by the foregoing description. It is also believed that it will be apparent that various changes may be made in the form, construction and arrangement of the components thereof without departing from the scope and spirit of the disclosure or without sacrificing all of its material advantages. The form herein before described being merely an explanatory embodiment thereof.

Insofar as the description above and the accompanying drawings disclose any additional subject matter that is not within the scope of the following contemplations below, the disclosure is not dedicated to the public and the right to file one or more applications to claim such additional inventions is reserved.

Although narrow contemplations are presented herein, it should be recognized the scope of this disclosure is much broader than presented by the contemplations. It is intended that broader claims will be submitted in an application that claims the benefit of priority from this application.

What is claimed is:

1. A mobile information handling apparatus, comprising:
a mobile computing device including at least one first communications port;
a keyboard module for providing alpha-numeric data entry to the mobile computing device, the keyboard module including at least one second communications port and at least one third communications port;
an adjustable dock for mounting at least one of the mobile computing device and the keyboard module, the adjustable dock including at least one fourth communications port, the adjustable dock configurable in one of: a first position for mounting the mobile computing device within the dock to create a first physical data connection via the at least one first communications port and the at least one fourth communications port, and a second position for mounting the mobile computing device and the keyboard module to create a second physical data connection via the at least one first communications port and the at least one second communications port and a third physical data connection via the at least one third communications port and the at least one fourth communications port,
wherein the at least one second communications port is positioned, as the keyboard module is mounted to the mobile computing device, to couple with the at least one first communications port, the at least one third communications port is positioned to couple, as the keyboard module is mounted to the mobile computing device, with the at least one fourth communications port of the adjustable dock, the keyboard module configured to create a physical connection, as the keyboard module is mounted to the mobile computing device and the adjustable dock, between the mobile computing device and the adjustable dock.

2. The apparatus of claim 1, further comprising:
at least two corner protectors including a first corner protector and a second corner protector, each of the at least two corner protectors including at least one strap anchor and at least one strap attachment point.

3. The apparatus of claim 2, further comprising:
a strap means including a first hook fastener and a second hook fastener;
a means for partially covering the hand of a user, the covering means including at least two openings for the strap means to penetrate while attached to the first corner protector and the second corner protector.

4. The apparatus of claim 2, further comprising:
a strap means including a first hook fastener and a second hook fastener, wherein the strap means is configured to be worn over a shoulder of a user for carrying the mobile information handling apparatus while the strap means is attached to the first corner protector and the second corner protector.

5. The apparatus of claim 2, further comprising:
a fan module connected to the mobile computing device for cooling the mobile computing device, the fan module incorporated in a back cover panel of the mobile computing device, wherein the fan module is controlled via a firmware interface of the mobile computing device.

6. The apparatus of claim 1, further comprising:
at least one lock tab including a stationary portion and a locking portion, the stationary portion coupled to the adjustable dock, the locking portion rotationally coupled to the stationary portion at a point of inflection and having a free position and a locking position, the locking portion configured to rotate at the point of inflection and lock into at least one slot in the mobile computing device, the locking portion limited in rotation away from the at least one slot by a hook feature.

7. The apparatus of claim 1, further comprising:
an external antenna module mountable to a housing of the mobile computing device, the antenna module communicating with the mobile computing device via a first signal and a second signal, the first signal conducted by a first connection and the second signal conducted by a second connection, the first connection made by a conductive cradle slidably inserted into a card slot of the mobile computing device, the conductive cradle configured to 1) receive and couple to a data card, 2) align the data card into the card slot and 3) conduct the first signal from the data card to at least one tab, the at least one tab configured to conduct the first signal from the antenna module while in proximity with a flexible grounding portion of the antenna module, the flexible grounding portion, while the antenna module is mounted to the mobile computing device configured to 1) prevent movement of the conductive cradle and 2) conduct the first signal, the second connection made by an insulated cable.

8. A mobile information handling system, comprising:
a mobile computing device including at least one first communications port;
a secure Personal information number Entry Device (PED) module including at least two tabs, the at least two tabs configured to interlock with at least two grooves of a cover of the mobile computing device, the PED module including:
a keypad configured for entry of a personal identification number;
a cover for the mobile information handling apparatus, the cover constructed of a single piece of material;
a display means for displaying information entered on the enclosed keypad, the displaying on a visible screen area of the mobile information handling apparatus;
wherein the keypad is enclosed in proximity to the cover, the enclosed keypad accessible through openings in the cover.

9. The system of claim 8, further comprising:
a keyboard module for providing alpha-numeric data entry to the mobile computing device, the keyboard module including at least one second communications port and at least one third communications port, the at least one second communications port positioned, as the keyboard module is mounted to the mobile computing device, to couple with the at least one first communications port, the at least one third communications port positioned to couple, as the keyboard module is mounted to the mobile computing device, with at least one fourth communications port of an adjustable dock, the keyboard module configured to create a physical connection, as the keyboard module is mounted to the mobile computing device, between the mobile computing device and the adjustable dock,
wherein the at least one first communications port and the at least one second communications port are configured to create a first physical data connection.

10. The system of claim 9, further comprising:
an adjustable dock for mounting at least one of the mobile computing device and the keyboard module, the adjustable dock including the at least one fourth communications port, the adjustable dock configurable in at least a first position for mounting the mobile computing device within the dock to create a first physical data connection via the at least one first communications port and the at least one fourth communications port, and a second position for mounting the mobile computing device and the keyboard module to create a second physical data connection via the at least one first communications port and the at least one second communications port and a third physical data connection via the at least one third communications port and the at least one fourth communications port.

11. The system of claim 10, further comprising:
at least one lock tab including a stationary portion and a locking portion, the stationary portion coupled to the adjustable dock, the locking portion rotationally coupled to the stationary portion at a point of inflection and having a free position and a locking position, the locking portion configured to rotate at the point of inflection and lock into at least one slot in the mobile computing device, the locking portion limited in rotation away from the at least one slot by a hook feature.

12. The system of claim 8, the secure Personal information number Entry Device (PED) module further including at least one of: a swipe slot for reading a magnetic-stripe card and an insertion slot for reading a smart card.

13. The system of claim 8, further comprising:
at least two corner protectors including a first corner protector and a second corner protector, each of the at least two corner protectors including at least one strap anchor and at least one strap attachment point.

14. The system of claim 13, further comprising:
a strap means including a first hook fastener and a second hook fastener;
a means for partially covering the hand of a user, the covering means including at least two openings for the strap means to penetrate while attached to the first corner protector and the second corner protector.

15. The system of claim 13, further comprising:
a strap means including a first hook fastener and a second hook fastener, wherein the strap means is configured to be worn over a shoulder of a user for carrying the mobile information handling apparatus while the strap means is attached to the first corner protector and the second corner protector.

16. The system of claim 13, further comprising:
a strap means including a first hook fastener and a second hook fastener, wherein the strap means is configured to distribute the weight of the mobile computing device across a hand of a user proximal to the mobile computing device.

17. The system of claim 8, further comprising:
a fan module connected to the mobile computing device for cooling the mobile computing device, the fan module incorporated in a back cover panel of the mobile computing device, wherein the fan module is controlled via a firmware interface of the mobile computing device.

18. A mobile information handling system, comprising:
a mobile computing device including at least one first communications port;
a secure Personal information number Entry Device (PED) module including a module cover piece for encapsulating an electronic circuitry of the secure PED module, the module cover piece configured for attachment to a front cover of the mobile computing device via a plurality of screws, the PED module including:
a keypad configured for entry of a personal identification number;
a cover for the mobile information handling system, the cover constructed of a single piece of material;
a display means for displaying information entered on the enclosed keypad, the displaying on a visible screen area of the mobile information handling apparatus;
wherein the keypad is enclosed in proximity to the cover, the enclosed keypad accessible through openings in the cover.

19. The system of claim 18, further comprising:
a keyboard module for providing alpha-numeric data entry to the mobile computing device, the keyboard module including at least one second communications port and at least one third communications port, the at least one second communications port positioned, as the keyboard module is mounted to the mobile computing device, to couple with the at least one first communications port, the at least one third communications port positioned to couple, as the keyboard module is mounted to the mobile computing device, with at least one fourth communications port of an adjustable dock, the keyboard module configured to create a physical connection, as the keyboard module is mounted to the mobile computing device, between the mobile computing device and the adjustable dock,
wherein the at least one first communications port and the at least one second communications port are configured to create a first physical data connection.

20. The system of claim 19, further comprising:
an adjustable dock for mounting at least one of the mobile computing device and the keyboard module, the adjustable dock including at least one fourth communications port, the adjustable dock configurable in two or more of: a first position for mounting the mobile computing device within the dock to create a first physical data connection via the at least one first communications port and the at least one fourth communications port, and a second position for mounting the mobile computing device and the keyboard module to create a second physical data connection via the at least one first communications port and the at least one second communications port and a third physical data connection via the at least one third communications port and the at least one fourth communications port.

21. The system of claim 20, further comprising:
at least one lock tab including a stationary portion and a locking portion, the stationary portion coupled to the adjustable dock, the locking portion rotationally coupled to the stationary portion at a point of inflection and having a free position and a locking position, the locking portion configured to rotate at the point of inflection and lock into at least one slot in the mobile computing device, the locking portion limited in rotation away from the at least one slot by a hook feature.

22. The system of claim 19, further comprising:
a fan module connected to the mobile computing device for cooling the mobile computing device, the fan module incorporated in a back cover panel of the mobile computing device, wherein the fan module is controlled via a firmware interface of the mobile computing device.

23. The system of claim 18, the secure Personal information number Entry Device (PED) module further including at least one of: a swipe slot for reading a magnetic-stripe card and an insertion slot for reading a smart card.

24. The system of claim 18, further comprising:
at least two corner protectors including a first corner protector and a second corner protector, each of the at least two corner protectors including at least one strap anchor and at least one strap attachment point.

25. The system of claim 24, further comprising:
- a strap means including a first hook fastener and a second hook fastener;
- a means for partially covering the hand of a user, the covering means including at least two openings for the strap means to penetrate while attached to the first corner protector and the second corner protector.

26. The system of claim 24, further comprising:
- a strap means including a first hook fastener and a second hook fastener, wherein the strap means is configured to be worn over a shoulder of a user for carrying the mobile information handling system while the strap means is attached to the first corner protector and the second corner protector.

27. The system of claim 24, further comprising:
- a strap means including a first hook fastener and a second hook fastener, wherein the strap means is configured to distribute the weight of the mobile computing device across a hand of a user proximal to the mobile computing device.

28. The system of claim 18, the at least one first communications port further comprising:
- an external antenna module mountable to a housing of the mobile computing device, the antenna module communicating with the mobile computing device via a first signal and a second signal, the first signal conducted by a first connection and the second signal conducted by a second connection, the first connection made by a conductive cradle slidably inserted into a card slot of the mobile computing device, the conductive cradle configured to 1) receive and couple to a data card, 2) align the data card into the card slot and 3) conduct the first signal from the data card to at least one tab, the at least one tab configured to conduct the first signal from the antenna module while in proximity with a flexible grounding portion of the antenna module, the flexible grounding portion, while the antenna module is mounted to the mobile computing device configured to 1) prevent movement of the conductive cradle and 2) conduct the first signal, the second connection made by an insulated cable.

29. A mobile information handling system, comprising:
- a mobile computing device including at least one first communications port;
- a keyboard module for providing alpha-numeric data entry to the mobile computing device, the keyboard module including at least one second communications port and at least one third communications port;
- an adjustable dock for mounting at least one of the mobile computing device and the keyboard module, the adjustable dock including at least one fourth communications port, the adjustable dock configurable in two or more of: a first position for mounting the mobile computing device within the dock to create a first physical data connection via the at least one first communications port and the at least one fourth communications port, and a second position for mounting the mobile computing device and the keyboard module to create a second physical data connection via the at least one first communications port and the at least one second communications port and a third physical data connection via the at least one third communications port and the at least one fourth communications port, the at least one second communications port positioned, as the keyboard module is mounted to the mobile computing device, to couple with the at least one first communications port, the at least one third communications port positioned to couple, as the keyboard module is mounted to the mobile computing device, with the at least one fourth communications port of the adjustable dock, the keyboard module configured to create a physical connection, as the keyboard module is mounted to the mobile computing device and to the adjustable dock, between the mobile computing device and the adjustable dock;
- at least one lock tab including a stationary portion and a locking portion, the stationary portion coupled to the adjustable dock, the locking portion rotationally coupled to the stationary portion at a point of inflection and having a free position and a locking position, the locking portion configured to rotate at the point of inflection and lock into at least one slot in the mobile computing device, the locking portion limited in rotation away from the at least one slot by a hook feature;
- at least two corner protectors including a first corner protector and a second corner protector, each of the at least two corner protectors including at least one strap anchor and at least one strap attachment point;
- a strap means including a first hook fastener and a second hook fastener, wherein the strap means is configured to be worn over a shoulder of a user for carrying the mobile information handling system while the strap means is attached to the first corner protector and the second corner protector; and
- an external antenna module mountable to a housing of the mobile computing device, the antenna module communicating with the mobile computing device via a first signal and a second signal, the first signal conducted by a first connection and the second signal conducted by a second connection, the first connection made by a conductive cradle slidably inserted into a card slot of the mobile computing device, the conductive cradle configured to 1) receive and couple to a data card, 2) align the data card into the card slot and 3) conduct the first signal from the data card to at least one tab, the at least one tab configured to conduct the first signal from the antenna module while in proximity with a flexible grounding portion of the antenna module, the flexible grounding portion, while the antenna module is mounted to the mobile computing device configured to 1) prevent movement of the conductive cradle and 2) conduct the first signal, the second connection made by an insulated cable;
- a fan module connected to the mobile computing device for cooling the mobile computing device, the fan module incorporated in a back cover panel of the mobile computing device, wherein the fan module is controlled via a firmware interface of the mobile computing device.

* * * * *